(12) United States Patent
Ishihata et al.

(10) Patent No.: US 6,362,269 B1
(45) Date of Patent: Mar. 26, 2002

(54) RESIN COMPOSITION

(75) Inventors: Koji Ishihata; Hisanaga Shimizu; Tetsushi Ono; Makoto Takagi, all of Chiyoda-ku (JP)

(73) Assignee: Teijin Chemicals, Ltd., Tokyo (JP)

(*) Notice: Subject to any disclaimer, the term of this patent is extended or adjusted under 35 U.S.C. 154(b) by 0 days.

(21) Appl. No.: 09/555,864

(22) PCT Filed: Oct. 6, 1999

(86) PCT No.: PCT/JP99/05510

§ 371 Date: Jun. 7, 2000

§ 102(e) Date: Jun. 7, 2000

(87) PCT Pub. No.: WO00/22044

PCT Pub. Date: Apr. 20, 2000

(30) Foreign Application Priority Data

Oct. 9, 1998  (JP) ............................. 10-287705
Oct. 12, 1998 (JP) ............................. 10-289300
Oct. 13, 1998 (JP) ............................. 10-290759
Oct. 14, 1998 (JP) ............................. 10-291973

(51) Int. Cl.[7] .............................................. C08L 69/00
(52) U.S. Cl. ....................... 524/449; 524/451; 524/456; 524/508; 524/537; 525/67; 525/146; 525/439
(58) Field of Search .................... 525/67, 146, 439; 524/449, 451, 456, 508, 537

(56) References Cited

U.S. PATENT DOCUMENTS 5,696,222 A * 12/1997 Kaneko

FOREIGN PATENT DOCUMENTS

| EP | 0391413 | 10/1990 |
|----|---------|---------|
| EP | 0893476 | 1/1999 |
| JP | 5239331 | 9/1993 |
| JP | 6179807 | 6/1994 |
| JP | 724863 | 1/1995 |
| JP | 768441 | 7/1995 |
| JP | 798892 | 10/1995 |
| JP | 827368 | 1/1996 |
| JP | 2683662 | 8/1997 |
| JP | 9310000 | 12/1997 |
| JP | 1025339 | 1/1998 |
| JP | 1180528 | 3/1999 |
| JP | 11130954 | 5/1999 |
| JP | 0924259 | 6/1999 |
| JP | 20007906 | 1/2000 |
| JP | 20007907 | 1/2000 |
| JP | 200080262 | 3/2000 |
| WO | 9812261 | 3/1998 |

* cited by examiner

Primary Examiner—David J. Buttner

(57) ABSTRACT

A resin composition comprising 100 parts by weight of a resin component selected from (a) an aromatic polycarbonate resin (A-1 component) obtained by melt polymerization and, when measured for fluorescent spectrum at an exciting wavelength of 320 nm, having a relative fluorescence intensity of $4 \times 10^{-3}$ or less at 465 nm relative to a standard substance, (b) a resin mixture of said A-1 component and a styrene-based resin (A-2 component), and (c) a resin mixture of said A-1 component and an aromatic polyester resin (A-3 component), and 5 to 200 parts by weight of a reinforcing filler. This resin composition gives a molded article superior in wet heat fatigue and various physical properties.

24 Claims, 1 Drawing Sheet

RESIN COMPOSITION

DETAILED DESCRIPTION OF THE INVENTION

The present invention relates to a resin composition. More particularly, the present invention relates to a resin composition which contains an aromatic polycarbonate resin as a resin component and is reinforced with a filler and which is superior in wet heat fatigue and impact properties.

PRIOR ART

Aromatic polycarbonate resins are superior in mechanical properties (e.g. impact resistance), heat resistance, transparency, etc. and are widely used. As the process for production of such an aromatic polycarbonate resin, there are known, for example, a process which comprises reacting a dihydric phenol (e.g. bisphenol A) with phosgene (interfacial polymerization) and a process which comprises subjecting a dihydric phenol (e.g. bisphenol) and a diaryl carbonate (e.g. diphenyl carbonate) to ester interchange reaction in a molten state (this process may be referred hereinafter to as melt polymerization). Of these processes, the process in which a dihydric phenol and a diaryl carbonate are subjected to ester interchange is advantageous, as compared with the interfacial polymerization, in that it uses no phosgene and halogen compound such as methylene chloride or the like, gives little burden to the environment, and can be produced at a low cost. It, therefore, is a promising technique.

An aromatic polycarbonate resin composition obtained by reinforcing an aromatic polycarbonate with a glass filler is described in Japanese Patent No. 2683662. The aromatic polycarbonate resin constituting this composition is composed substantially of an aromatic polycarbonate resin produced by the melt polymerization. It is disclosed that the composition is superior in Izod impact resistance to compositions of an aromatic polycarbonate resin obtained by interfacial polymerization. However, it could not be said that a composition comprising an aromatic polycarbonate resin obtained by melt polymerization gives a molded article sufficient in wet heat fatigue or in impact resistance of flat.

Meanwhile, resin mixtures composed of an aromatic polycarbonate resin and a styrene-based resin were developed as a material superior in impact resistance and moldability to aromatic polycarbonate resins, and are widely used in various application fields such as OA appliances, automobiles and the like. Resin compositions obtained by reinforcing the above resin mixtures with a filler also in widely used.

In JP-B-7-98892 is described a resin composition composed of an aromatic polycarbonate resin and an aromatic vinyl-diene-vinyl cyanide copolymer (ABS resin). The above publication discloses that the aromatic polycarbonate resin used in the mixture is composed substantially of an aromatic polycarbonate resin produced by melt polymerization and that the resin is superior in weld strength to mixtures of an aromatic polycarbonate resin obtained by the interfacial polymerization. However, this mixture is difficult to say to be also satisfactory in melt stability and moreover, has had drawbacks in that its fatigue strength and mechanical strength decrease strikingly when used at a high temperature and at a high humidity. Therefore, the there was limitation in applications of the above resin mixture to automobile parts (e.g. outer handle, inner handle and instrument panel), OA parts (e.g. inner parts of copying machine and casing of notebook type personal computer), machine parts (e.g. electric tool cover), etc., all requiring good fatigue strength under high temperatures and high humidities (i.e. wet heat fatigue) and good mechanical strength under high temperatures and high humidities (i.e. retention of wet heat strength).

Further, resin mixtures composed of an aromatic polycarbonate resin and an aromatic polyester resin were developed as a material superior in chemical resistance and impact resistance to aromatic polycarbonate resins, and are in wide use for various applications fields such as automobiles, OA appliances and the like. Resin compositions obtained by reinforcing such a resin mixture with a filler are also widely used.

In JP-B-7-68441 is described a resin mixture composed of an aromatic polycarbonate resin and an aromatic polyester resin. This publication discloses that the aromatic polycarbonate resin used in the mixture is composed substantially of an aromatic polycarbonate resin produced by melt polymerization and that the resin is superior in melt stability to mixtures of an aromatic polycarbonate resin obtained by the interfacial polymerization. However, such a mixture is difficult to say to be satisfactory in melt stability and moreover, has had a drawback in wet heat fatigue. Therefore, sufficient care must be taken in use of the mixture for applications such as automobile parts (e.g. outer handle and inner handle), machine parts (e.g. electric tool cover), etc., all requiring mechanical strengths, chemical resistance, wet heat fatigue, etc. No material fully satisfying such requirements is not yet developed.

As mentioned above, though aromatic polycarbonate resins, or their mixtures with a styrene-based resin or an aromatic polyester resin have superior mechanical properties, they are unsatisfactory in wet heat fatigue, melt stability, impact resistance of flat, etc., when an aromatic polycarbonate resin produced by melt polymerization is used. They, therefore, have found limited use in application fields where such properties are required.

Problems to be solved by the invention

An object of the present invention is to provide a resin composition improved in the problem of an aromatic polycarbonate resin produced by melt polymerization or a resin mixture containing the resin, that is, fatigue under high temperatures and high humidities.

Other object of the present invention is to further improve, in a resin composition comprising the above aromatic polycarbonate resin or the above resin mixture containing the resin and a reinforcing filler, its fatigue under high temperatures and high humidities to increase its strength retention.

Still other object of the present invention is to provide a resin mixture or a resin composition, which is further excellent in melt stability, chemical resistance and mechanical properties.

Means for solving the problems

The present inventors made studies in order to achieve the above objects. As a result, it has been found that, in the aromatic polycarbonate resin produced by melt polymerization, a unique bond considered to be formed by the melt polymerization is measured from the fluorescent spectrum of the resin and the fluorescence intensity measured has an influence on the physical properties of a resin mixture or composition containing the aromatic polycarbonate resin. That is, it was found that a resin mixture or composition obtained by using an aromatic polycarbonate resin having a fluorescence intensity of certain level or lower is extremely improved in physical properties, particularly in wet heat fatigue. The finding has led to the completion of the present invention.

According to the present invention, there are provided the following resin composition-I and resin composition-II.

Resin composition-I

A resin composition composed substantially of
(1) 100 parts by weight of a resin component selected from:
  (a) an aromatic polycarbonate resin (A-1 component) obtained by melt polymerization and, when measured for fluorescent spectrum at an exciting wavelength of 320 nm, having a relative fluorescence intensity of $4 \times 10^{-3}$ or less at 465 nm relative to a standard substance,
  (b) a resin mixture composed of 10 to 90 parts by weight of said aromatic polycarbonate resin (A-1 component) and 90 to 10 parts by weight of a styrene-based resin (A-2 component), or
  (c) a resin mixture composed of 10 to 90 parts by weight of said aromatic polycarbonate resin (A-1 component) and 90 to 10 parts by weight of an aromatic polyester resin (A-3 component), and
(2) 5 to 200 parts by weight of at least one kind of reinforcing filler selected from the group consisting of a fibrous filler (B-1 component) and a platy filler (B-2 component).

Resin composition-II

A resin composition composed substantially of
(a) 10 to 90 parts by weight of an aromatic polycarbonate resin (A-1 component) obtained by melt polymerization and, when measured for fluorescent spectrum at an exciting wavelength of 320 nm, having a relative fluorescence intensity of $4 \times 10^{-3}$ or less at 465 nm relative to a standard substance, and
(b) 90 to 10 parts by weight of a styrene-based resin (A-2 component) or an aromatic polyester resin (A-3 component).

The resin composition of the present invention is described more specifically below.

The aromatic polycarbonate resin used in the present invention is obtained by melt polymerization in which a dihydric phenol and a carbonate precursor are subjected to ester interchange reaction. As typical examples of the dihydric phenol used herein, there can be mentioned hydroquinone, resorcinol, 1,6-dihydroxynaphthalene, 2,6-dihydroxynaphthalene, 4,4'-dihydroxydiphenyl, bis(4-hydroxyphenyl)methane, 1,1-bis(4-hydroxyphenyl)-1-phenylmethane, bis{(4-hydroxy-3,5-dimethyl)phenyl}methane, 1,1-bis(4-hydroxyphenyl)ethane, 1,2-bis(4-hydroxyphenyl)ethane, 1,1-bis(4-hydroxyphenyl)-1-phenylethane, bis(4-hydroxyphenyl)diphenylmethane, bis(4-hydroxyphenyl)-1-naphthylmethane, 2,2-bis(4-hydroxyphenyl)propane (commonly known as: bisphenol A), 2-(4-hydroxyphenyl)-2-(3-hydroxyphenyl)propane, 2,2-bis{(4-hydroxy-3-methyl)phenyl}propane, 2,2-bis{(4-hydroxy-3,5-dimethyl)phenyl}propane, 2,2-bis{(3,5-dibromo-4-hydroxy)phenyl}propane, 2,2-bis{(3,5-dichloro-4-hydroxy)phenyl}propane, 2,2-bis{(3-bromo-4-hydroxy)phenyl}propane, 2,2-bis{(3-chloro-4-hydroxy)phenyl}propane, 4-bromoresorcinol, 2,2-bis{(3-isopropyl-4-hydroxy)phenyl}propane, 2,2-bis{(3-phenyl-4-hydroxy)phenyl}propane, 2,2-bis{(3-ethyl-4-hydroxy)phenyl}propane, 2,2-bis{(3-n-propyl-4-hydroxy)phenyl}propane, 2,2-bis{(3-sec-butyl-4-hydroxy)phenyl}propane, 2,2-bis{(3-tert-butyl-4-hydroxy)phenyl}propane, 2,2-bis{(3-cyclohexyl-4-hydroxy)phenyl}propane, 2,2-bis{(3-methoxy-4-hydroxy)phenyl}propane, 2,2-bis(4-hydroxyphenyl)hexafluoropropane, 1,1-dibromo-2,2-bis(4-hydroxyphenyl)ethylene, 1,1-dichloro-2,2-bis{(3-phenoxy-4-hydroxy)phenyl}ethylene, ethylene glycol bis(4-hydroxyphenyl)ether, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 1,1-bis(4-hydroxyphenyl)isobutane, 2,2-bis(4-hydroxyphenyl)pentane, 2,2-bis(4-hydroxyphenyl)-4-methylpentane, 3,3-bis(4-hydroxyphenyl)pentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 1,1-bis(4-hydroxyphenyl)cyclododecane, 9,9-bis(4-hydroxyphenyl)fluorene, 9,9-bis{(4-hydroxy-3-mehtyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamanthane, 4,4'-dihydroxydiphenylsulfone, bis{(3,5-dimethyl-4-hydroxy)phenyl}sulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether and 4,4'-dihydroxydiphenyl ester. These compounds can be used singly or in admixture of two or more kinds.

Of these, preferably used is a homopolymer or copolymer obtained from at least one kind of bisphenol selected from the group consisting of bisphenol A, 2,2-bis{(4-hydroxy-3-methyl)phenyl}propane, 2,2-bis{(3,5-dibromo-4-hydroxy)phenyl}propane, ethylene glycol bis(4-hydroxyphenyl)ether, 2,2-bis(4-hydroxyphenyl)hexafluoropropane, 2,2-bis(4-hydroxyphenyl)butane, 1,1-bis(4-hydroxyphenyl)cyclohexane, 1,1-bis(4-hydroxyphenyl)-3,3,5-trimethylcyclohexane, 4,4'-dihydroxydiphenylsulfone, bis{(3,5-dimethyl-4-hydroxy)phenyl}sulfone, 4,4'-dihydroxydiphenyl sulfoxide, 4,4'-dihydroxydiphenyl sulfide and 4,4'-dihydroxydiphenyl ketone. Particularly preferable is a homopolymer of bisphenol A.

As the carbonate precursor, there is used a carbonate ester or a haloformate. As specific examples, there are mentioned diphenyl carbonate, ditolyl carbonate, bis(chlorophenyl) carbonate, m-cresyl carbonate, dinaphthyl carbonate, bis(diphenyl) carbonate, dimethyl carbonate, diethyl carbonate, dibutyl carbonate and dicyclohexyl carbonate; however, the carbonate precursor is not restricted thereto. Diphenyl carbonate, a dihaloformate of a dihydric phenol, or the like is preferably used, and diphenyl carbonate is more preferably used. These carbonate esters can be used singly or in combination of two or more kinds.

In reacting a dihydric phenol with a carbonate precursor by melt polymerization to produce a polycarbonate resin, it is possible to as necessary use a catalyst, a terminal-blocking agent, an antioxidant for dihydric phenol, etc. The polycarbonate resin may be a branched polycarbonate resin containing a polyfunctional aromatic compound having three or more functional groups as a comonomer component, or a polyester carbonate resin containing an aromatic or aliphatic difunctional carboxylic acid as a comonomer component. Or, a mixture of two or more polycarbonate resins may be used as the polycarbonate resin.

As the aromatic compound having three or more functional groups, there can be mentioned fluoroglucine; fluoroglucide; trisphenols such as 4,6-dimethyl-2,4,6-tris(4-hydroxyphenyl)heptene-2, 2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol, 4-{4-[1,1-bis(4- hydroxyphenyl)ethyl]benzene}-α, α-dimethylbenzylphenol and the like; tetra(4-hydroxyphenyl)methane; bis(2,4-dihydroxyphenyl) ketone; 1,4-bis(4,4-dihydroxytriphenylmethyl)benzene; trimellitic acid; pyromellitic acid; benzophenonetetracarboxylic acid; chlorides of these acids; 2-(4-hydroxyphenyl)-2-(3'-phenoxycarbonyl-4'-hydroxyphenyl)propane; 2-(4-hydroxyphenyl)-2-(3'-carboxy-4'-hydroxyphenyl)propane; etc. Of these, preferred are 1,1,1-tris(4-hydroxyphenyl)ethane and 1,1,1-tris(3,5-dimethyl-4-hydroxyphenyl)ethane, and particularly preferred is 1,1,1-tris(4-hydroxyphenyl)ethane.

The reaction by melt polymerization is an ester interchange reaction between dihydric phenol and carbonate ester, and is conducted by mixing, with heating, a dihydric phenol and a carbonate ester in the presence of an inert gas and distilling the formed alcohol or phenol. The reaction temperature is ordinarily in a range of 120 to 350° C. although it differs depending upon, for example, the boiling point of formed alcohol or phenol. In the latter stage of the reaction, the reaction system is made vacuum about 10 to 0.1 Torr (1,333 to 13.3 Pa) to make easy the distillation of the formed alcohol or phenol. The reaction time is ordinarily about 1 to 4 hours.

In the melt polymerization, a polymerization catalyst may be used for accelerating the polymerization speed. As the polymerization catalyst, there can be used, for example, a catalyst consisting of (i) an alkali metal compound and/or (ii) a nitrogen-containing basic compound; and condensation is conducted.

As the alkali metal compound used as the catalyst, there can be mentioned, for example, hydroxides, hydrogencarbonates, carbonates, acetates, nitrates, nitrites, sulfites, cyanates, thiocyanates, stearates, boron hydrides, benzoates, hydrogenphosphates, bisphenol salts and phenol salts of alkali metals.

As specific examples of the alkali metal compound, there can be mentioned sodium hydroxide; potassium hydroxide; lithium hydroxide; sodium hydrogencarbonate; potassium hydrogencarbonate; lithium hydrogencarbonate; sodium carbonate; potassium carbonate; lithium carbonate; sodium acetate; potassium acetate; lithium acetate; sodium nitrate; potassium nitrate; lithium nitrate; sodium nitrite; potassium nitrite; lithium nitrite; sodium sulfite; potassium sulfite; lithium sulfite; sodium cyanate; potassium cyanate; lithium cyanate; sodium thiocyanate; potassium thiocyanate; lithium thiocyanate; sodium stearate; potassium stearate; lithium stearate; sodium boronhydroxide; lithium boronhydroxide; potassium boronhydride; sodium phenylborate; sodium benzoate; potassium benzoate; lithium benzoate; disodium hydrogenphosphate; dipotassium hydrogenphosphate; dilithium hydrogenphosphate; disodium salt, dipotassium salt and dilithium salt of bisphenol A; and sodium salt, potassium salt and lithium salt of phenol.

The alkali metal compound as the catalyst can be used in an amount of $10^{-9}$ to $10^{-4}$ moles, preferably $10^{-8}$ to $10^{-5}$ moles per mole of the dihydric phenol. An amount deviating from the above range is not preferred because it adversely affects the properties of the polycarbonate obtained or the ester interchange does not proceed sufficiently, making impossible the production of a polycarbonate of high molecular weight.

As the nitrogen-containing basic compound as the catalyst, there can be mentioned, for example, ammonium hydroxides having an alkyl group, aryl group, alkylaryl group or the like, such as tetramethylammonium hydroxide ($Me_4NOH$), tetraethylammonium hydroxide ($Et_4NOH$), tetrabutylammonium hydroxide ($Bu_4NOH$), benzyltrimethylammonium hydroxide ($\phi$ —$CH_2(Me)_3NOH$), hexadecyltrimethylammonium hydroxide and the like; tertiary amines such as triethylamine, tributylamine, dimethylbenzylamine, hexadecyldimethylamine and the like; and basic salts such as tetramethylammonium borohydride ($Me_4NBH_4$), tetrabutylammonium borohydride ($Bu_4NBH_4$), tetrabutylammonium tetraphenylborate ($Bu_4NBPh_4$), tetramethylammonium tetraphenylborate ($Me_4NBPh_4$) and the like. Of these, preferred are tetramethylammonium hydroxide ($Me_4NOH$), tetraethylammonium hydroxide ($Et_4NOH$) and tetrabutylammonium hydroxide ($Bu_4NOH$), and particularly preferred is tetramethylammonium hydroxide ($Me_4NOH$).

The above nitrogen-containing basic compound is used preferably in such an amount that the ammonium nitrogen atom in nitrogen-containing basic compound comes to be $1 \times 10^{-5}$ to $1 \times 10^{-3}$ equivalent per mole of the dihydric phenol. The amount is more preferably $2 \times 10^{-5}$ to $7 \times 10^{-4}$ equivalent on the same basis. The amount is particularly preferably $5 \times 10^{-5}$ to $5 \times 10^{-4}$ equivalent on the same basis.

In the present invention, there can be used, as necessary, a catalyst generally used in esterification or ester interchange reaction, such as alkoxides of alkali metal or alkaline earth metal, organic acid salts of alkali metal or alkaline earth metal, zinc compounds, boron compounds, aluminum compounds, silicon compounds, germanium compounds, organotin compounds, lead compounds, osmium compounds, antimony compounds, manganese compounds, titanium compounds, zirconium compounds, or the like. These catalysts may be used singly or in combination of two or more kinds. The use amount of such a polymerization catalyst is selected in a range of preferably $1 \times 10^{-9}$ to $1 \times 10^{-5}$ equivalent, more preferably $1 \times 10^{-8}$ to $5 \times 10^{-6}$ equivalent per mole of the raw material dihydric phenol.

In such polymerization, in order to reduce the phenolic terminal groups, it is preferred to add, in the latter stage of polycondensation reaction or after the completion of the reaction, a compound such as phenol, p-tert-butylphenol, p-tert-butylphenylphenyl carbonate, p-tert-butylphenyl carbonate, p-cumylphenol, p-cumylphenylphenyl carbonate, p-cumylphenyl carbonate, bis(chlorophenyl) carbonate, bis (bromophenyl) carbonate, bis(nitrophenyl) carbonate, bis (phenylphenyl) carbonate, chlorophenylphenyl carbonate, bromophenylphenyl carbonate, nitrophenylphenyl carbonate, diphenyl carbonate, methoxycarbonylphenylphenyl carbonate, 2,2,4-trimethyl-4-(4-hydroxyphenyl) chroman, 2,4,4-trimethyl-2-(4-hydroxyphenyl)chroman, ethoxycarbonylphenylphenyl carbonate or the like. Of these, preferred are 2-chlorophenylphenyl carbonate, 2-methoxycarbonylphenylphenyl carbonate and 2-ethoxycarbonylphenylphenyl carbonate, and particularly preferred is 2-methoxycarbonylphenylphenyl carbonate.

In the present invention, it is preferred to block the terminals of the aromatic polycarbonate with a terminal-blocking agent. It is also preferred to control the terminal hydroxyl group concentration of the aromatic polycarbonate resin before blocking the terminal with a terminal-blocking agent, to 20 mole % or more, preferably 30 mole % or more, further preferably 40 mole % or more, based on the total terminals. Thereby, a specified terminal group can be introduced at a high proportion and the aromatic polycarbonate resin can be improved at a high level. Generally, it is advantageous to apply a terminal-blocking agent to an aromatic polycarbonate resin whose terminal hydroxyl group concentration is 30 to 95 mole % of the total terminals. The proportion of terminal hydroxyl group in aromatic polycarbonate resin before blocking the terminal with terminal blocking agent can be controlled by the ratio of raw materials fed, i.e. dihydric phenol and diphenyl carbonate. Here, the terminal hydroxyl group concentration (moles) of a determined amount of aromatic polycarbonate resin can be determined by an ordinary method, i.e. $^1$H-NMR.

The terminal hydroxyl group concentration in the aromatic polycarbonate resin of the present invention is preferably 0 to 40 mole %, more preferably 0 to 18 mole %, further preferably 0 to 9 mole %, most preferably 0 to 7 mole % of the total terminals. Here, "0 mole %" indicates "not detectable" when the measurement was made by $^1$H-NMR. When the terminal hydroxyl group concentration is in the above range, further improvement in wet heat fatigue and impact resistance of flat can be obtained.

In the present invention, it is preferred that the catalytic activity of the aromatic polycarbonate resin is neutralized by using a deactivator. As specific examples of the deactivator, there can be mentioned benzenesulfonic acid; p-toluenesulfonic acid; sulfonic acid esters such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, phenyl p-toluenesulfonate and the like; trifluoromethanesulfonic acid; naphthalenesulfonic acid; sulfonated polystyrene; methyl acrylate-sulfonated styrene copolymer; 2-phenyl-2-propyl dodecylbenzenesulfonate; 2-phenyl-2-butyl dodecylbenzenesulfonate; tetrabutylphosphonium octylsulfonate; tetrabutylphosphonium decylsulfonate; tetrabutylphosphonium benzenesulfonate; tetraethylphosphonium dodecylbenzenesulfonate; tetrabutylphosphonium dodecylbenzenesulfonate; tetrahexylphosphonium dodecylbenzenesulfonate; tetraoctylphosphonium dodecylbenzenesulfonate; decylammonium butylsulfate; decylammonium decylsulfate; dodecylammonium methylsulfate; dodecylammonium ethylsulfate; dodecylmethylammonium methylsulfate; dodecyldimethylammonium tetradecylsulfate; tetradecyldimethylammonium methylsulfate; tetramethylammonium hexylsulfate; decyltrimethylammonium hexadecylsulfate; tetrabutylammonium dodecylbenzylsulfate; tetraethylammonium dodecylbenzylsulfate; and tetramethylammonium dodecylbenzylsulfate. However, the deactivator is not restricted thereto. These compounds may be used in combination of two or more kinds.

Of the deactivators, a phosphonium or ammonium salt-based deactivator is particularly stable per se even at 200° C. or higher. The deactivator, when added to an aromatic polycarbonate resin, quickly neutralizes the polymerization catalyst present in the resin, whereby a stable aromatic polycarbonate resin can be obtained. The deactivator is used in an amount of preferably 0.01 to 500 ppm, more preferably 0.01 to 300 ppm, particularly preferably 0.01 to 100 ppm relative to the polycarbonate formed after polymerization.

Such a deactivator is used in an amount of preferably 0.5 to 50 moles per mole of the polymerization catalyst. There is no particular restriction as to the method of adding the deactivator to the aromatic polycarbonate resin after polymerization. For example, the deactivator may be added while the reaction product, i.e. the aromatic polycarbonate resin, is in a molten state; or, the deactivator may be added after the aromatic polycarbonate resin is once pelletized and then remelted. In the former case, it is possible that while the reaction product, i.e. the aromatic polycarbonate resin, in the reactor or extruder is in a molten state, the deactivator is added thereto to form an aromatic polycarbonate resin and then, the resin is passed through an extruder for pelletization; or, the addition of the deactivator and subsequent kneading may be conducted while the aromatic polycarbonate resin after polymerization is passed through an extruder for pelletization, to obtain an aromatic polycarbonate resin.

In production of an aromatic polycarbonate resin by melt polymerization, when a polymerization catalyst is used for acceleration of the polymerization, the polymerization catalyst often remains in the aromatic polycarbonate resin after polymerization. If the residual catalyst is allowed to stand as it is, the aromatic polycarbonate resin causes trouble such as decomposition or post-reaction owing to the catalytic activity of the residual catalyst. Further, in a composition between such an aromatic polycarbonate resin having a residual catalytic activity and a filler, the adverse effect of the residual catalyst is increased and, moreover, new problem such as reduction in impact resistance of flat and the like may arise. Therefore, it is preferred to control the residual catalytic activity.

"Residual catalytic activity index" is used as a yardstick for controlling the residual catalytic activity, and the index is measured as follows. As a tester, there is used a rotary rheometer which can measure the range of the melt viscosity of a sample resin to be tested; the sample resin is placed in a sufficient nitrogen current so as to prevent the sample resin from being oxidized by external oxygen and is rotated in a given direction at a given angular velocity under the condition of a given temperature at which the sample resin is melted, and the change of the melt viscosity of the sample resin during the rotation is measured. As a jig for rheometer, used in the measurement, the one having a cone-circular plate shape is used so that the strain of the whole sample becomes constant, that is, the shear speed of the sample becomes constant. The change of melt viscosity per minute, calculated from the following formula (i), is used as residual catalytic activity index.

Residual catalytic activity index (%)=|(melt viscosity after 30 minutes−melt viscosity after 5 minutes)|÷[(melt viscosity after 5 minutes)×25]×100     (i)

The residual catalytic activity index is preferably 2% or less, more preferably 1% or less, further preferably 0.5% or less, most preferably 0.2% or less. A residual catalytic activity index of this range is preferred because the aromatic polycarbonate resin shows little property change with time.

It is essential that the aromatic polycarbonate resin of the present invention, produced by melt polymerization, has a relative fluorescence intensity of $4\times10^{-3}$ or less. When the relative fluorescence intensity is larger than $4\times10^{-3}$, there arise a new problem that an aromatic polycarbonate resin composition between such an aromatic polycarbonate resin and a filler shows reduced wet heat fatigue and reduced impact resistance of flat. Further, a resin mixture between an aromatic polycarbonate resin having a relative fluorescence intensity larger than the above specified value and a styrene-based resin or an aromatic polyester resin shows, as well, reduced wet heat fatigue and reduced physical properties. The relative fluorescence intensity is preferably $3\times10^{-3}$ or less, most preferably $2\times10^{-3}$ or less.

In order to obtain an aromatic polycarbonate having a relative fluorescence intensity of the specified value or less, which causes substantially no thermal decomposition and is low in reduction in mechanical properties, it is desirable that the following means are taken. It is preferred to control the amount of the polymerization catalyst used, as mentioned below; to deactivate the polymerization catalyst with a sulfonic acid-based compound; to control, with respect to the molecular terminals of the polycarbonate, the proportion of terminal hydroxyl group in the total molecular terminal groups; and to block the molecular terminals of the aromatic polycarbonate.

Further, in order to obtain an aromatic polycarbonate having a relative fluorescence intensity of specified value or less, which causes substantially no thermal decomposition and is low in reduction in mechanical properties, it is preferred to keep the temperature of the aromatic polycarbonate resin always at 255° C. or below, in the melt polymerization reaction.

Further, in order to obtain an aromatic polycarbonate having a relative fluorescence intensity of the above specified value or less, which causes substantially no thermal decomposition and is low in reduction in mechanical properties, it is preferred that with respect to the stirring of the stirrer vane of the polymerizer, a value, obtained by dividing the shear rate (unit: 1/sec), represented by the following formula of the stirrer vane of the polymerizer by the square of the radius (unit: cm) of the stirrer vane, is controlled to 0.1 to 0.001 (1/(sec×cm$^2$)).

Shear rate=(circumferential speed of stirrer vane)/(gap between polymerizer and stirrer vane)

wherein the unit of shear rate is 1/sec, the unit of circumferential speed of stirrer vane is cm/sec, and the unit of gap between polymerizer and stirrer vane is cm.

With respect to the catalyst system used in production of the aromatic polycarbonate, a nitrogen-containing basic compound and an alkali metal compound are used in combination, and the amount of the alkali metal compound used is controlled at $5.0\times10^{-6}$ mole or less per mole of bisphenol A, whereby the ester interchange proceeds industrially advantageously and a polycarbonate satisfactory in flowability and color can be obtained. It is preferred to carry out these means in appropriate combination.

The aromatic polycarbonate resin has a molecular weight of preferably 12,000 to 30,000, more preferably 14,000 to 27,000, particularly preferably 15,000 to 25,000 in terms of viscosity-average molecular weight (M). An aromatic polycarbonate resin having such a viscosity-average molecular weight is preferred because it gives a composition which is sufficient in strength, good in melt flowability during molding, and free from molding strain. The viscosity-average molecular weight referred to herein is a value obtained by applying a specific viscosity (asp) obtained from a solution of 0.7 g of a polycarbonate resin dissolved in 100 ml of methylene chloride at 20° C., into the following formula.

$\eta sp/c = [\eta] + 0.45 \times [\eta]^2 c$ ([$\eta$]is an intrinsic viscosity)

$[\eta] = 1.23 \times 10^{-4} M^{0.83}$ c=0.7

The resin composition-I of the present invention comprises at least one kind of reinforcing filler selected from the group consisting of a fibrous filler (B-1 component) and a platy filler (B-2 component), as mentioned earlier. The resin component contained in the resin composition-I is any of the following (a), (b) and (c).

(a) An aromatic polycarbonate resin (A-1 component).
(b) A resin mixture composed of 10 to 90 parts by weight of said aromatic polycarbonate resin (A-1 component) and 90 to 10 parts by weight of a styrene-based resin (A-2 component).
(c) A resin mixture composed of 10 to 90 parts by weight of said aromatic polycarbonate resin (A-1 component) and 90 to 10 parts by weight of an aromatic polyester resin (A-3 component).

In the resin components (a), (b) and (c), there is used, as the aromatic polycarbonate resin (A-1 component), the above-mentioned aromatic polycarbonate resin having a relative fluorescence intensity of $4\times10^{-3}$ or less. Next, description is made on the styrene-based resin (A-2 component) and the aromatic polyester resin (A-3 component) used in the resin components (b) and (c), respectively.

The styrene-based resin (A-2 component) is a styrene-based resin obtained by polymerizing a styrene monomer and, as necessary, at least one kind of monomer selected from other vinyl monomer and a rubbery polymer, both copolymerizable with the styrene monomer.

The styrene monomer used in the styrene-based resin (A-2 component) includes styrene and styrene derivatives such as α-methylstyrene, o-methylstyrene, p-methylstyrene, vinylxylene, ethylstyrene, dimethylstyrene, p-tert-butylstyrene, vinylnaphthalene, methoxystyrene, monobromostyrene, dibromostyrene, fluorostyrene, tribromostyrene and the like. Styrene is particularly preferred. These compounds can be used singly or in combination of two or more kinds. The styrene-based resin contains the above styrene monomer units in an amount of at least 20% by weight, preferably 30% by weight, relative to the total units.

As the other vinyl monomer copolymerizable with the styrene monomer, there can be mentioned vinyl cyanide compounds such as acrylonitrile, methacrylonitrile and the like; aryl acrylates such as phenyl acrylate, benzyl acrylate and the like; alkyl acrylates such as methyl acrylate, ethyl acrylate, propyl acrylate, butyl acrylate, amyl acrylate, hexyl acrylate, 2-ethylhexyl acrylate, octyl acrylate, cyclohexyl acrylate, dodecyl acrylate and the like; aryl methacrylates such as phenyl methacrylate, benzyl methacrylate and the like; alkyl methacrylates such as methyl methacrylate, ethyl methacrylate, propyl methacrylate, butyl methacrylate, amyl methacrylate, hexyl methacrylate, 2-ethylhexyl methacrylate, octyl methacrylate, cyclohexyl methacrylate, dodecyl methacrylate and the like; epoxy group-containing methacrylic acid esters such as glycidyl methacrylate and the like; maleimide-based monomers such as maleimide, N-mehtylmaleimide, N-phenylmaleimide and the like; and α,β-unsaturated carboxylic acids and anhydrides thereof, such as acrylic acid, methacrylic acid, maleic acid, maleic anhydride, phthalic acid, itaconic acid and the like.

As the rubber-like polymer copolymerizable with the styrene monomer, there can be mentioned polybutadiene; polyisoprene; styrene-butadiene random or block copolymer; acrylonitrile-butadiene copolymer; copolymer between butadiene and alkyl acrylate or methacrylate; diene-based copolymers such as butadiene-isoprene copolymer and the like; ethylene-α-olefin copolymers such as ethylene-propylene random or block copolymer, ethylene-butene random or block copolymer and the like; ethylene-unsaturated carboxylic acid ester copolymers such as ethylene-methacrylate copolymer, ethylene-butyl acrylate copolymer and the like; ethylene- vinyl aliphatic acid copolymers such as ethylene-vinyl acetate copolymer and the like; ethylene-propylene-nonconjugated diene terpolymers such as ethylene-propylene-hexadiene copolymer and the like; acrylic rubbers such as polybutyl acrylate and the like; composite rubbers wherein a polyorganosiloxane rubber component and a polyalkyl (meth)acrylate rubber component have an inter-penetrating network structure so that the two components are unseparable from each other (the composite rubbers are hereinafter referred to as IPN type rubbers); etc.

As the styrene-based resin, there can be mentioned, for example, polystyrene, styrene-butadiene-styrene copolymer (SBS), hydrogenated styrene-butadiene-styrene copolymer (hydrogenated SBS), hydrogenated styrene-isoprene-styrene copolymer (SEPS), high-impact polystyrene (HIPS), acrylonitrile-styrene copolymer (AS resin), acrylonitrile-butadiene-styrene copolymer (ABS resin), methyl methacrylate-butadiene-styrene copolymer (MBS resin), methyl methacrylate-acrylonitrile-butadiene-styrene copolymer (MABS resin), acrylonitrile-acrylic rubber-styrene copolymer (AAS resin), acrylonitrile-ethylene/propylene-based rubber-styrene copolymer (AES resin), styrene-IPN type rubber copolymer, and mixtures thereof. The styrene-based thermoplastic resin may also be one obtained using a catalyst such as metallocene catalyst or the like, having such high stereoregularity as possessed by syndiotactic polystyrene. Or, the styrene-based resin may be a (co)polymer having a narrow molecular weight distribution, a block copolymer, or a (co)polymer having high stereoregularity, obtained by anion living polymerization, radical living polymerization or the like. Of these, preferred are a polystyrene (PS), a high-impact polystyrene (HIPS), an acrylonitrile-styrene copolymer (AS resin), a methyl methacrylate-butadiene-styrene copolymer (MBS resin) or an acrylonitrile-butadiene-styrene copolymer (ABS resin). An ABS resin is preferred most. Two or more kinds of styrene-based resins may be used in admixture.

The ABS resin is a mixture of a thermoplastic graft copolymer obtained by grafting a vinyl cyanide compound and an aromatic vinyl compound to a diene-based rubber component and a copolymer between a vinyl cyanide compound and an aromatic vinyl compound. As the diene-based rubber component forming the ABS resin, there is used a rubber having a glass transition temperature of 10° C. or lower, such as polybutadiene, polyisoprene, styrene-butadiene copolymer or the like. The proportion thereof is preferably 5 to 80% by weight, particularly preferably 10 to 50% by weight, based on 100% by weight of the ABS resin. As the vinyl cyanide compound grafted to the diene-based rubber component, there can be mentioned those mentioned previously, and acrylonitrile can be used particularly preferably. As the aromatic vinyl compound grafted to the diene-based rubber component, there can be used those mentioned previously, and styrene and α-methylstyrene can be used particularly preferably. The proportions of the components grafted to the diene-based rubber component are preferably 20 to 95% by weight, particularly preferably 50 to 90% by weight per 100% by weight of the ABS resin. The proportion of the vinyl cyanide compound is preferably 5 to 50% by weight and the proportion of the aromatic vinyl compound is preferably 95 to 50% by weight, per 100% by weigh of the total of the vinyl cyanide compound and the aromatic vinyl compound. Part of the components grafted to the diene-based rubber component may be used in admixture with methyl (meth)acrylate, ethyl acrylate, maleic anhydride, N-substituted maleimide or the like. The proportion of such a compound is preferably 15% by weight or less relative to the ABS resin. In the reaction, it is possible to, as necessary, use an initiator, a chain transfer agent, an emulsifier, etc. of known type.

In the ABS resin, the rubber particles have diameters of preferably 0.1 to 5.0 μm, more preferably 0.3 to 3.0 μm, particularly preferably 0.4 to 1.5 μm. The distribution of the rubber particle diameters may be a single distribution or may have two or more mountains. Also in the morphology, the rubber particles may have a single phase or may have a salami morphology wherein an occlusion phase is formed within each rubber particle.

It is well known that ABS resins contain a vinyl cyanide compound and an aromatic vinyl compound, not grafted to the diene-based rubber component. The ABS resin used in the present invention may contain, as well, free polymer components formed during the production of the ABS resin. The free copolymer composed of vinyl cyanide compound and aromatic vinyl compound has preferably a molecular weight of 0.2 to 1.0, more preferably 0.25 to 0.5, in terms of inherent viscosity.

The proportion of the grafted vinyl cyanide compound and aromatic vinyl compound is preferably 20 to 200%, more preferably 20 to 70% relative to the diene-based rubber component.

The ABS resin may be one produced by any of bulk polymerization, suspension polymerization and emulsion polymerization. The copolymerization may be performed in a single stage or multi-stage. As the ABS resin, there is also preferably used a blend between an ABS resin obtained by the above production and a vinyl compound polymer separately prepared copolymerizing an aromatic vinyl compound and a vinyl cyanide compound.

In the resin composition-I of the present invention, the proportions of the aromatic polycarbonate resin (A-1 component) and the styrene-based resin (A-2 component) are such that the aromatic polycarbonate (A-1 component) is 10 to 90 parts by weight, preferably 40 to 90 parts by weight and the styrene-based resin (A-2 component) is 90 to 10 parts by weight, preferably 60 to 10 parts by weight. When the proportion of the aromatic polycarbonate resin is less than 10% by weight, that is, the proportion of the styrene-based resin is more than 90% by weight, the impact resistance of the resulting composition is insufficient.

Next, description is made on the aromatic polyester resin (A-3 component) used in the resin composition-I of the present invention.

The aromatic polyester resin (A-3 component) is a (co) polymer obtained by conducting a condensation reaction of, as main components, an aromatic dicarboxylic acid or a reactive derivative thereof and a diol or an ester derivative thereof.

As the aromatic dicarboxylic acid, there can be preferably used terephthalic acid, isophthalic acid, ortho-phthalic acid, 1,5-naphthalenedicarboxylic acid, 2,6-naphthalenedicarboxylic acid, 4,4'-biphenyldicarboxylic acid, 4,4'-biphenyletherdicarboxylic acid, 4,4'-biphenylmethanedicarboxylic acid, 4,4'-biphenylsulfonedicarboxylic acid, 4,4'-biphenylisopropylidenedicarboxylic acid, 1,2-bis(phenoxy) ethane-4,4'-dicarboxylic acid, 2,5-anthracenedicarboxylic acid, 2,6-anthracenedicarboxylic acid, 4,4'-p-terphenylenedicarboxylic acid, 2,5-pyridinedicarboxylic acid, etc. Terephthalic acid and 2,6-naphthalenedicarboxylic acid can be used particularly preferably.

The aromatic dicarboxylic acid may be used in admixture of two more kinds. Together with the above dicarboxylic acid, there can be used a small amount of at least one kind of aliphatic dicarboxylic acid (e.g. adipic acid, azelaic acid, sebacic acid or dodecanedioic acid) or alicyclic dicarboxylic acid (e.g. cyclohexanedicarboxylic acid).

As the diol which is a component of the aromatic polyester resin, there can be mentioned aliphatic diols such as ethylene glycol, propylene glycol, butylene glycol, hexylene glycol, neopentyl glycol, pentamethylene glycol, hexamethylene glycol, decamethylene glycol, 2-methyl-1,3-propanediol, diethylene glycol, triethylene glycol and the like; alicyclic diols such as 1,4-cyclohexanedimethanol and the like; aromatic ring-containing diols such as 2,2-bis(β-hydroxyethoxyphenyl)propane and the like; and mixtures thereof. It is possible to contain, as a comonomer, a small amount of at least one kind of long chain diol having a molecular weight of 400 to 6,000, such as polyethylene glycol, poly-1,3-propylene glycol, polytetramethylene glycol or the like.

By introducing a small amount of a branching agent, the aromatic polyester resin may be allowed to have a branched structure. There is no particular restriction as to the kind of the branching agent used; however, there can be mentioned, as the branching agent, trimesic acid, trimellitic acid, trimethylolethane, trimethylolpropane, pentaerythritol, etc.

As specific aromatic polyester resins (A-3 component), there can be preferably used polyethylene terephthalate (PET), polypropylene terephthalate, polybutylene terephthalate (PBT), polyhexylene terephthalate, polyethylene naphthalate (PEN), polybutylene naphthalate (PBN), polyethylene-1,2-bis(phenoxy)ethane-4,4'-dicarboxylate, copolyesters (e.g. polyethylene isophthalate/terephthalate and polybutylene terephthalate/isophthalate), and mixtures thereof. Of these, preferred are polyethylene terephthalate and polyethylene naphthalate both using ethylene glycol as the diol component, because a good balance is obtained in thermal properties and mechanical properties. Further preferred is an aromatic polyester resin containing polyethylene terephthalate or polyethylene naphthalate in an amount of 50% by weight or more based on 100% by weight of the aromatic polyester resin; particularly preferred is an aromatic polyester resin containing polyethylene terephthalate in an amount of 50% by weight or more. Also preferred is polybutylene terephthalate or polybutylene naphthalate, both using butylene glycol as the diol component, because a good balance is obtained in moldability and mechanical properties. A polybutylene terephthalate/polyethylene naphthalate mixture in a weight ratio of 2 to 10 is more preferred.

As to the terminal group structure of the aromatic polyester resin, there is no particular restriction. Besides the case in which the amount of the terminal hydroxyl group and the amount of the terminal carboxyl group are about the same, a case is possible in which the amount of either one group is more than the other group. By, for example, reacting these terminal groups with a compound reactive therewith, the terminal groups may be blocked.

The aromatic polyester resin is produced by polymerizing a dicarboxylic acid component and a diol component, with heating, in the presence of a polycondensation catalyst containing titanium, germanium, antimony or the like, according to an ordinary method and discharging water or lower alcohol formed as a by-product out of the reaction system. For example, the germanium-based polymerization catalyst can be exemplified by an oxide, a hydroxide, a halide, an alcholate and a phenolate of germanium. Specific examples are germanium oxide, germanium hydroxide, germanium tetrachloride, tetramethoxygermanium or the like.

In the present invention, it is possible to use a known compound of manganese, zinc, calcium, magnesium or the like, used in the ester interchange reaction which is the former stage of the polycondensation, and to conduct polycondensation by adding compounds of phosphoric acid or phosphorous acid or the like to deactivate the catalyst, after the ester interchange reaction.

As to the molecular weight of the aromatic polyester resin, there is no particular restriction; however, the intrinsic viscosity, measured at 25° C. using o-chlorophenol as a solvent, is 0.4 to 1.2, preferably 0.65 to 1.15.

In the resin composition-I of the present invention, the proportions of the aromatic polycarbonate resin (A-1 component) and the aromatic polyester resin (A-3 component) are such that the aromatic polycarbonate (A-1 component) is 10 to 90 parts by weight, preferably 20 to 80 parts by weight and the aromatic polyester resin (A-3 component) is 90 to 10 parts by weight, preferably 80 to 20 parts by weight. When the proportion of the aromatic polycarbonate resin is less than 10 parts by weight, that is, the proportion of the aromatic polyester resin is more than 90 parts by weight, the impact resistance of the resulting composition is insufficient.

In the present invention, it is possible to add an elastomeric polymer (A-4 component) to the resin composition to allow the resin composition to have higher impact resistance. As the elastomeric polymer (A-4 component) usable, there can be mentioned a graft copolymer obtained by grafting, to a rubber component having a glass transition temperature of 10° C. or lower, at least one kind of monomer selected from aromatic vinyls, vinyl cyanide, acrylic acid esters, methacrylic acid esters, and vinyl compounds copolymerizable therewith. It is also possible to use a thermoplastic elastomer having no crosslinked structure, such as polyurethane elastomer, polyester elastomer, styrene-based elastomer, olefin-based elastomer, polyamide elastomer, polyetheramide elastomer or the like.

As the rubber component having a glass transition temperature of 10° C. or lower, there can be mentioned butadiene rubber, butadiene-acrylic composite rubber, acrylic rubber, acrylic-silicone composite rubber, isoprene rubber, styrene-butadiene rubber, chloroprene rubber, ethylene-propylene rubber, nitrile rubber, ethylene-acrylic rubber, silicone rubber, epichlorohydrin rubber, fluororubber, and rubbers obtained by hydrogenating the unsaturated bonds of the above rubbers.

Particularly, the elastomeric polymer is preferably an elastomeric polymer containing a rubber component having a glass transition temperature of −10° C. or lower, particularly preferably a rubber-like elastomer for which a butadiene rubber, a butadiene-acrylic composite rubber, an acrylic rubber or an acrylic-silicon composite rubber is used. The butadiene-acrylic composite rubber is a rubber obtained by copolymerizing a butadiene rubber component and an acrylic rubber component or by polymerizing the above two components to form an interpenetrating network (IPN) structure so that the two components become unseparable; and the acrylic-silicone composite rubber is a rubber obtained by fabricating an acrylic rubber component and a silicone rubber component to form an IPN structure so that the two components become unseparable or by copolymerizing the acrylic rubber component with the functional group of the silicone rubber component. The amount of the above rubber component is preferably 40% by weight or more, more preferably 60% by weight or more in 100% by weight of the elastomeric polymer.

As the aromatic vinyl, there can be mentioned styrene, α-methylstyrene, p-methylstyrene, alkoxystyrenes, halogenated styrenes, etc. Styrene is preferred particularly. As the acrylic acid ester, there can be mentioned methyl acrylate, ethyl acrylate, butyl acrylate, cyclohexyl acrylate, octyl acrylate, etc. As the methacrylic acid ester, there can be mentioned methyl methacrylate, ethyl methacrylate, butyl methacrylate, cyclohexyl methacrylate, octyl methacrylate, etc. Methyl methacrylate is preferred particularly.

The elastomeric polymer containing a rubber component having a glass transition temperature of 10° C. or lower can be produced by any of bulk polymerization, solution polymerization, suspension polymerization and emulsion polymerization. The method of copolymerization may be one stage grafting or multi-stage grating. The elastomeric polymer may be a mixture between the above-mentioned elastomeric polymer and a copolymer of the graft components alone which is formed as a by-product in production of said elastomeric polymer. Such rubber-like polymer is being marketed and is easily available. For example, as the elastomeric polymer containing a butadiene rubber or a butadiene-acrylic composite rubber as the main rubber component having a glass transition temperature of 10° C. or lower, there are mentioned Kaneace B series (products of Kaneka Corporation), Metablen C series (products of Mitsubishi Rayon Co., Ltd.) and EXL series, HIA series, BTA series and KCA series (products of Kureha Chemical Industry Co., Ltd.). As the elastomeric polymer containing an acrylic-silicone composite rubber as the main rubber component having a glass transition temperature of 10° C. or lower, there are mentioned Metablen S-2001 and SRK-200 (products of Mitsubishi Rayon Co., Ltd.). The amount of the elastomeric polymer (A-4 component) is preferably 1 to 15% by weight, more preferably 2 to 10% by weight per the total resin component of the present resin composition.

In the resin composition-I of the present invention, a reinforcing filler used together with an aromatic polycarbonate resin (A-1 component), a resin mixture of said aromatic polycarbonate resin (A-1 component) and a styrene-based resin (A-2 component), or a resin mixture of said aromatic polycarbonate resin (A-1 component) and an aromatic polyester resin (A-3 component) is a fibrous filler (B-1 component) or a platy filler (B-2 component). The B-1 component and the B-2 component may be used also in combination.

Next, description is made on the fibrous filler (B-1 component) and the platy filler (B-2 component) both as the reinforcing filler.

As the fibrous filler (B-1 component), there can be mentioned, for example, a glass fiber, a milled glass fiber, wollastonite, a carbon fiber, a metal-based electroconductive fiber, and whiskers such as potassium titanate whiskers, aluminum borate whiskers and the like. Of these, preferred are a glass fiber, wollastonite, a carbon fiber and a metal-based electroconductive fiber; most preferred are a glass fiber, wollastonite and a carbon fiber.

The glass fiber has no particular restriction as to the glass composition such as A-glass, C-glass, E-glass or the like, and may contain, in some cases, a component such as $TiO_2$, $Zr_2O$, $BeO$, $CeO_2$, $SO_3$, $P_2O_5$ or the like. An E-glass (alkali-free glass) fiber is preferred because it gives no adverse effect on the aromatic polycarbonate resin. The same is applied to the glass composition of the milled glass fiber to be later described. The glass fiber is obtained by rapidly cooling a molten glass while being stretched, according to one of various methods, to obtain a desired fiber. In this case, there is no particular restriction as to the conditions of rapid cooling and stretching. The cross-sectional shape of the glass fiber may be an ordinary true circle or a non-circular cross-section represented by the parallel arrangement of fibers of true circle cross-section. The glass fiber may be a mixture of a glass fiber having a true circle cross-section and a fiber having a non-circular cross-section. The glass fiber has an average fiber diameter of 1 to 25 µm, preferably 5 to 17 µm. Use of a glass fiber having an average fiber diameter smaller than 1 µm results in impaired moldability, while use of a glass fiber having an average fiber diameter larger than 25 µm results in impaired appearance and no sufficient reinforcing effect.

The glass fiber may be coated with a metal on the surface in order to allow the glass fiber to have electroconductivity. The metal-coated glass fiber having a diameter of 6 to 20 µm is particularly preferred. The metal-coated glass fiber is obtained by coating the glass fiber with a metal such as nickel, copper, cobalt, silver, aluminum, iron, an alloy thereof, or the like according to a known method such as plating, vapor deposition or the like. The metal to be coated is preferably at least one kind of metal selected from nickel, copper and cobalt from the standpoints of electroconductivity, corrosion resistance, productivity and economy.

The glass fiber can be subjected to a bonding treatment with an epoxy resin, a urethane resin, an acrylic resin, a nylon resin or the like. Further, the glass fiber is preferably subjected to a surface treatment by using a silane coupling agent described later or the like. The glass fiber has an average fiber length of about 200 to 400 µm in a molded article.

The milled glass fiber has an L/D of 10 or smaller, and is produced by cutting roving strands or chopped strands of glass fiber or grinding them to a desired length by mean of a ball mill or the like. It is preferably used when a molded article made from the present resin composition is allowed to have improved appearance. In the above L/D, L is a length of milled glass fiber in the fiber axis direction, and D is a fiber diameter in the cross-sectional direction. As the glass fiber used in production of the milled glass fiber, the same glass fiber as mentioned previously can be used. The milled glass fiber is preferably subjected to a surface treatment with a silane coupling agent or the like, similarly to the glass fiber. The milled glass fiber preferably has an average fiber diameter of 6 to 23 µm and an average fiber length of 0.02 to 0.1 mm.

The wollastonite used as the B-1 component is a natural white mineral of needle-like crystals, composed mainly of calcium silicate, and is substantially represented by $CaSiO_3$. It ordinarily contains about 50% by weight of $SiO_2$, about 47% by weight of CaO and the remainder of $Fe_2O_3$, $Al_2O_3$, etc, and has a specific gravity of about 2.9. Preferably used is a wollastonite in which in the particle diameter distribution, particles having diameters of 3 µm or more is 75% or more and particles having diameters of 10 µm or more is 5% or less and which has an aspect ratio (L/D) of 3 or more, particularly 8 or more. When the particles having diameters of 3 µm or more, in the particle diameter distribution is 75% or more, sufficient reinforcing effect and higher rigidity are obtained. When the particles having diameters of 10 µm or more is 5% or less, good impact strength is obtained and the molded article obtained have better surface appearance. Particularly when the aspect ratio is 8 or more, sufficient reinforcing effect and higher rigidity are obtained. A wollastonite having an aspect ratio of 50 or less is more preferred in view of the working environment. The wollastonite may be surface-treated with an ordinary surface-treating agent, for example, a coupling agent such as a silane coupling agent later described, a titanate-based coupling agent or the like.

The carbon fiber usable as the B-1 component has no particular restriction as to the kind, and there are used various known carbon fibers, for example, carbonous fibers and graphite-like material fibers, which are produced from polyacrylonitrile, pitch, rayon, lignin, hydrocarbon gas, etc. A carbon fiber produced from polyacrylonitrile is particularly preferred for its excellent fiber strength. The carbon fiber may be subjected to an oxidation treatment at the surface by a means represented by ozone, plasma, nitric acid, electrolysis or the like. This treatment is preferably conducted in order to enhance the adhesion to the resin component. The carbon fiber generally has a form of chopped strands, roving strands, milled fiber or the like.

In order to allow the carbon fiber to have electroconductivity, the carbon fiber surface may be coated with a metal. The metal-coated carbon fiber having a fiber diameter of 6 to 20 μm is particularly referable. The metal-coated carbon fiber is obtained by coating a carbon fiber with a metal such as nickel, copper, cobalt, silver, aluminum, iron, an alloy thereof, or the like according to a known method such as plating, vapor deposition or the like. The metal to be coated is preferably at least one kind of metal selected from nickel, copper and cobalt from the standpoints of electroconductivity, corrosion resistance, productivity and economy. A nickel-coated carbon fiber is preferred particularly.

The carbon fiber bound with a variety of sizing agent such as epoxy resin, urethane resin, acrylic resin, nylon resin or the like is favorably used. The sizing agent is preferably an epoxy resin and/or an urethane resin.

The metal-based electroconductive fiber usable as the B-1 component has no particular restriction as to the kind, and includes metal fibers and metal-coated fibers. There can be mentioned, for example, metal fibers such as stainless steel fiber, aluminum fiber, copper fiber, brass fiber and the like. These fibers can be used in combination of two or more kinds. The metal fiber has a diameter of preferably 4 to 80 μm, particularly preferably 6 to 60 μm. The electroconductive fiber may be surface-treated with a silane coupling agent, a titanate coupling agent, an aluminum coupling agent or the like. Further, it may be subjected to a binding treatment using an olefin resin, a styrene-based resin, a polyester resin, an epoxy resin, a urethane resin or the like. These fibrous fillers may be used singly or in combination of two or more kinds.

The other reinforcing filler used in the resin composition of the present invention is a platy filler (B-2 component). As the platy filler, there can be mentioned glass flakes, metal flakes, mica, talc, kaolin, etc. Of these, preferred are glass flakes, metal flakes, mica and talc, and particularly preferred are glass flakes, mica and talc.

The glass flakes and metal flakes preferably have an average particle diameter of 10 to 1,000 μm and when the average particle diameter is indicated as (a) and the thickness as (c), an (a)/(c) ratio of 5 to 500, preferably 6 to 450, further preferably 7 to 400. When the average particle diameter is less than 10 μm or the (a)/(c) ratio is less than 5, no sufficient rigidity is obtained, while the average particle diameter is more than 1,000 μm or the (a)/(c) ratio is more than 500, the molded article obtained is inferior in appearance and weld strength. Herein, the average particle diameter of the glass flakes or the metal flakes is obtained as a median diameter in particle size weight distribution, determined by the standard sieve method. Of the glass flakes and the metal flakes, the glass flakes are preferred.

The glass flakes and the metal flakes can be subjected to a binding treatment with an epoxy resin, a urethane resin, an acrylic resin, a nylon resin or the like. Further, they are preferably subjected to a surface treatment with a silane coupling agent described later or the like.

The glass flakes may be metal-coated glass flakes. The metal used for coating may be any metal capable of coating glass flakes. There can be mentioned, for example, gold, silver, nickel, aluminum, chromium, and metal oxides such as tin oxide, titanium oxide, zinc oxide, cerium oxide, magnesium oxide and the like. There is no particular restriction as to the method of coating, and any method can be employed. For example, there can be mentioned electroless plating, vapor deposition and sputtering. The thickness of coating is generally 0.00001 to 10 μm, and coating is made uniformly on the flat surface of glass flake and preferably also on the edge surface of glass flake. The metal-coated glass flakes can be used as they are or may be coated with a treating agent thereon for oxidation prevention or the like.

The mica is preferably a powdery mica having an average particle diameter of 1 to 80 μm, from viewpoint of obtaining good rigidity. The mica is a ground product of a silicate mineral containing aluminum, potassium, magnesium, sodium, iron, etc. Mica includes muscovite, phlogopite, biotite, artificial mica, etc. and any of these can be used. Phlogopite and biotite are not practical because they are soft per se, as compared with muscovite, and contain a large amount of Fe in the main component and are blackish per se. Artificial mica is not practical, either, because it is obtained by replacing the OH group of natural phlogopite with F and is expensive per se. Muscovite is preferred. The method of grinding used in producing the mica includes a dry grinding method of grinding a mica ore using a dry grinder, and a wet grinding method of coarsely grinding a mica ore using a dry grinder, adding water to the coarse powder to make a slurry, then grinding the slurry using a wet grinder, and conducting dehydration and drying. The dry grinding method gives a low cost and is commonly used, but has a difficulty in thinly and finely grinding a mica ore; therefore, in the present invention, a mica produced by the wet grinding method is used preferably.

The mica used has an average particle diameter, measured by microtrack laser diffraction, of 10 to 100 μm, preferably 20 to 50 μm. When the average particle diameter of mica is less than 10 μm, no sufficient improvement in rigidity is obtained. When the average particle diameter is more than 100 μm, neither sufficient improvement in rigidity nor sufficient weld strength is obtained.

The mica used has a thickness of 0.01 to 1 μm, preferably 0.03 to 0.3 μm, as measured by observation through an electron microscope. When the thickness of mica is less than 0.01 μm, the mica tends to break during the melt processing stage and no improvement in rigidity is obtained. Meanwhile, when the thickness is more than 1 μm, no sufficient improvement in rigidity is obtained. The mica may be surface-treated with a silane coupling agent or the like, and may be granulated into granules using a binder. Specific examples of the mica include Micalet A-41 which is a mica powder produced by K.K. Yamaguchi Unmo Kogyosho. They are easily procured in the market.

As the mica, a metal-coated mica can be used. The metal used for coating of mica can be any metal capable of coating mica. There can be mentioned, for example, gold, silver, nickel, aluminum, chromium, and metal oxides such as tin oxide, titanium oxide, zinc oxide, cerium oxide, magnesium oxide and the like. There is no particular restriction as to the method of coating, and any coating method can be employed. There can be mentioned, for example, electroless plating, vapor deposition and sputtering. The thickness of coated metal is generally 0.00001 to 10 μm. Coating is made uniformly on the flat surface of mica and preferably also on the edge surface of mica. The metal-coated mica can be used per se, but it is possible to further coat a treating agent on the surface of the coated metal for oxidation prevention, etc.

The talc is a hydrous magnesium silicate having a layer structure, is represented by a chemical formula $4SiO_2 \cdot 3MgO \cdot 2H_2O$, generally contains about 63% by weight of $SiO_2$, about 32% by weight of MgO, about 5% by weight of $H_2O$ and the remainder of $Fe_2O_3$, $Al_2O_3$, etc., and has a specific gravity of about 2.7. A powdery talc having an average particle diameter of 0.01 to 20 µm is preferred for obtainment of sufficient rigidity. The average particle diameter of talc referred to herein is a value measured by laser diffraction. When the talc has an average particle diameter smaller than the above range, it has insufficient rigidity, while when the average particle diameter exceeds the above range, a molded article obtained has inferior appearance.

The kaolin is a hydrous aluminum silicate having a layer structure and is represented by a chemical formula $Al_2Si_2O_5(OH)_4$. Generally, natural kaolin includes three types, i.e. kaolinite, dickite and nacrite, and any of these can be used. The kaolin is preferably a powdery kaolin having an average particle diameter of 0.01 to 20 µm for obtainment of sufficient rigidity. The average particle diameter of kaolin referred to herein is a value measured by laser diffraction. When the kaolin has an average particle diameter smaller than the above range, it has insufficient rigidity, while when the average particle diameter exceeds the above range, a molded article obtained has inferior appearance.

The fibrous filler (B-1 component) and the platy filler (B-2 component) are preferably subjected to a surface treatment with a silane coupling agent or the like. The surface treatment prevents the decomposition of the aromatic polycarbonate resin, and improves adhesion, whereby the wet heat fatigue and impact resistance of flat intended by the present invention can be made superior. The silane coupling agent referred to herein is a silane compound represented by the following formula:

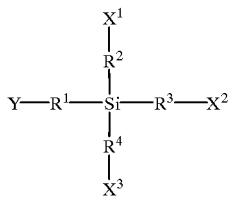

wherein Y is a group having a reactivity or affinity with the resin matrix, such as amino group, epoxy group, carboxylic acid group, vinyl group, mercapto group, halogen atom or the like, $R^1$, $R^2$ and $R^3$ are each a single bond or an alkylene group having 1 to 7 carbon atoms, in which amide bond, ester bond, ether bond or imino bond may exist in the chain; and $X^1$, $X^2$ and $X^3$ are each an alkoxy group preferably having 1 to 4 carbon atoms or a halogen atom. Specifically, there can be mentioned vinyltrichlorosilane, vinyltriethoxysilane, vinyltrimethoxysilane, γ-methacryloxypropyltrimethoxysilane, β-(3,4-epoxycyclohexyl)ethyltrimethoxysilane, γ-glycidoxypropyltrimethoxysilane, N-β(aminoethyl)γ-aminopropyltrimethoxysilane, γ-aminopropyltriethoxysilane, N-phenyl-γ-aminopropyltrimethoxysilane, γ-mercaptopropyltrimethoxysilane, γ-chloropropyltrimethoxysilane, etc. The fibrous filler (B-1 component) and the platy filler (B-2 component) may be subjected to a surface treatment with, for example, a cyclic compound, oligomer or polymer of methylhydrogensiloxane.

In the present invention, the proportion of the reinforcing filler is 5 to 200 parts by weight, preferably 10 to 150 parts by weight, particularly preferably 10 to 100 parts by weight per 100 parts by weight of the resin component. A proportion less than 5 parts by weight is not practical because the resulting composition has insufficient rigidity. A proportion more than 200 parts by weight is not practical, either, because the resulting composition is difficult to extrude.

In the resin composition-I of the present invention, there are used a reinforcing agent and an aromatic polycarbonate resin having a relative fluorescence intensity of $4 \times 10^{-3}$ or less to obtain a molded article superior in rigidity and improved in wet heat fatigue. Especially, when the fibrous filler (B-1 component) is used as the reinforcing filler, a molded article improved in impact resistance of flat is obtained. Meanwhile, when the platy filler (B-2 component) is used as the reinforcing filler, a molded article superior in weld strength is obtained.

As mentioned in the foregoing, the present invention also provides a resin composition-II. The resin composition-II, unlike the resin composition-I, contains no reinforcing filler and is characterized by consisting substantially of the following resin mixture.

That is, the resin composition-II includes the following two types of resin mixtures.

(1) A resin composition composed substantially of:
  10 to 90 parts by weight of (a) an aromatic polycarbonate resin (A-1 component) obtained by melt polymerization and, when measured for fluorescent spectrum at an exciting wavelength of 320 nm, having a relative fluorescence intensity of $4 \times 10^{-3}$ or less at 465 nm relative to a standard substance, and
  90 to 10 parts by weight of (b) a styrene-based resin A-2 component).

This resin composition is preferably composed of 40 to 90 parts by weight of the aromatic polycarbonate resin (A-1 component) and 60 to 10 parts by weight of the styrene-based resin (A-2 component).

(2) A resin composition composed substantially of:
  10 to 90 parts by weight of (a) an aromatic polycarbonate resin (A-1 component) obtained by melt polymerization and, when measured for fluorescent spectrum at an exciting wavelength of 320 nm, having a relative fluorescence intensity of $4 \times 10^{-3}$ or less at 465 nm relative to a standard substance, and
  90 to 10 parts by weight of (b) an aromatic polyester resin (A-3 component).

This resin composition is preferably composed of 20 to 80 parts by weight of the aromatic polycarbonate resin (A-1 component) and 80 to 20 parts by weight of the aromatic polyester resin.

The resin composition-II may further contain, besides the above resin component, an elastomeric polymer (A-4 component). Desirably, the proportion of the elastomeric polymer (A-4 component) is 1 to 15% by weight, preferably 2 to 10% by weight relative to the total resin composition.

In the resin composition-II, any of the aromatic polycarbonate resin (A-1 component), the styrene-based resin (A-2 component), the aromatic polyester resin (A-3 component) and the elastomeric polymer (A-4 component) can be the same as mentioned with respect to the resin composition-I. Therefore, description of these components is not made. Preferable compounds of each component are also the same as those mentioned as preferable compounds in the resin composition-I.

When the resin composition-II of the present invention comprises the aromatic polycarbonate resin (A-1 component) and the styrene-based resin (A-2 component) as the resin components, it gives a molded article superior in impact resistance and moldability and further in wet heat fatigue and retention of wet heat strength. Meanwhile, when the resin composition-II of the present invention comprises the aromatic polycarbonate resin (A-1 component) and the aromatic polyester resin (A-3 component) as the resin components, a molded article superior in chemical resistance and also wet heat fatigue can be obtained.

To the resin composition-I and resin composition-II of the present invention can be added resin additives such as heat stabilizer, release agent, light stabilizer, antistatic agent, flame retardant and the like in such amounts that the objects of the present invention are not impaired. Also, other resin may be added in a small amount for improvement of physical properties or moldability. Description is made below on these additives.

A heat stabilizer can be added to the resin composition of the present invention for prevention of reduction in molecular weight or deterioration of color during molding. As the heat stabilizer, there can be mentioned, for example, phosphorous acid, phosphoric acid, phosphonous acid, phosphonic acid and esters thereof. Specifically, there can be mentioned triphenyl phosphite, tris(nonylphenyl) phosphite, tris (2,4-di-tert-butylphenyl) phosphate, tridecyl phosphate, trioctyl phosphate, trioctadecyl phosphite, didecyl monophenyl phosphite, dioctyl monophenyl phosphate, diisopropyl monophenyl phosphite, monobutyl diphenyl phosphite, monodecyl diphenyl phosphite, monooctyl diphenyl phosphite, bis(2,6-di-tert-butyl-4-methylphenyl) pentaerythritol diphosphite, 2,2-5 methylenebis(4,6-di-tert-butylphenyl) octyl phosphite, bis(nonylphenyl) pentaerythritol diphosphite, bis(2,4-di-tert-butylphenyl) pentaerythritol diphosphite, distearylpentaerythritol diphosphite, tributyl phosphate, triethyl phosphate, trimethyl phosphate, triphenyl phosphate, diphenyl monoorthoxenyl phosphate, dibutyl phosphate, dioctyl phosphate, diisopropyl phosphate, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, bis(2,4-di-tert-butylphenyl)-4-biphenylene phosphonite, dimethyl phenyl phosphonite, diethyl phenyl phosphonite, dipropyl phenyl phosphonite, etc. Of these, preferably used are trimethyl phosphate, tris(nonylphenyl) phosphite, tris(2,4-di-tert-butylphenyl) phosphite, distearylpentaerythritol diphosphite, bis(2,6-di-tert-butyl-4-methylphenyl) pentaerythritol diphosphite, bis(2,4-di-tert-butylphenyl) pentaerythritol diphosphite, tetrakis(2,4-di-tert-butylpenyl)-4,4'-biphenylene diphosphonite, tetrakis(2,4-di-tert-butylpenyl)-4,3'-biphenylene diphosphonite, tetrakis(2,4-di-tert-butylpenyl)-3,3'-biphenylene diphosphonite, bis(2,4-di-tert-butylphenyl)-4-biphenylene phosphonite and dimethyl phenyl phosphonite. These heat stabilizers can be used singly or in admixture of two or more kinds. The amount of the heat stabilizer used is 0.0001 to 1 part by weight, preferably 0.0005 to 0.5 parts by weight, more preferably 0.001 to 0.1 part by weight, per 100 parts by weight of the resin component.

To the resin composition of the present invention may also be added an ordinary known antioxidant for the purpose of oxidation prevention. As such an antioxidant, there can be mentioned, for example, pentaerythritol tetrakis(3-mercaptopropionate), pentaerythritol tetrakis(3-laurylthiopropionate), glycerol 3-stearylthiopropionate, triethylene glycol bis[3-(3-tert-butyl-5-methyl-4-hydroxyphenyl)propionate], 1,6-hexanediol bis[3-(3,5-di-tert-butyl-4-hydroxyphenyl)propionate], pentaerythritol tetrakis[3-(3,5-di-tert-butyl-4-hydroxyphenyl)propionate], octadecyl 3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylene-bis(3,5-di-tert-butyl-4-hydroxy-hydrocinnamide), diethyl 3,5-di-tert-butyl-4-hydroxy-benzylphosphate, tris(3,5-di-tert-butyl-4-hydroxybenzyl) isocyanurate and 3,9-bis{1,1-dimethyl-2-[β-(3-tert-butyl-4-hydroxy-5-methylphenyl)propionyloxy]ethyl}-2,4,8,10-tetraoxaspiro(5,5)undecane. The amount of the antioxidant used is preferably 0.0001 to 0.05 part by weight per 100 parts by weight of the resin component.

To the resin composition of the present invention can also be added a release agent for improving releasability from a mold at melt molding. As such a release agent, there can be mentioned an olefinic wax, a silicone oil, an organopolysiloxane, a higher fatty acid ester of a mono- or polyhydric alcohol, paraffin wax, beeswax, etc. The amount of the release agent added is preferably 0.01 to 2 parts by weight per 100 parts by weight of the resin component (A).

As the olefinic wax, a polyethylene wax and/or a 1-alkene polymer is used particularly preferably. With these release agents, very good release effect is obtained. As the polyethylene wax, those widely known can be used, and there can be mentioned, for example, a polyethylene wax obtained by polymerizing ethylene at a high temperature at a high pressure, a polyethylene wax obtained by thermal decomposition of polyethylene, and a polyethylene wax obtained by separating low-molecular components from an ethylene polymer for purification. There is no particular restriction as to the molecular weight and degree of branching of the polyethylene wax, and preferably used are those having the molecular weight of preferably 1,000 or more in terms of number-average molecular weight. There can be also used a type obtained by modifying a polyethylene wax with maleic acid and/or maleic anhydride. As the 1-alkene polymer, a polymer of a 1-alkene having 5 to 40 carbon atoms can be used. There can also be used a type obtained by copolymerizing a 1-alkene with maleic acid and/or maleic anhydride. This type can give improved impact strength. The molecular weight of the 1-alkene polymer is preferably 1,000 or more in terms of number-average molecular weight. In this case, strength and good releasability can be obtained.

The higher fatty acid ester is preferably a partial ester or whole ester between a mono- or polyhydric alcohol having 1 to 20 carbon atoms and a saturated fatty acid having 10 to 30 carbon atoms. As the partial or whole esters of a mono- or polyhydric alcohol and a saturated fatty acid, there can be mentioned stearic acid monoglyceride, stearic acid diglyceride, stearic acid triglyceride, stearic acid monosorbitate, behenic acid monoglyceride, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitan monostearate, 2-ethylhexyl stearate, etc. Of these, preferred are stearic acid monoglyceride, stearic acid triglyceride and pentaerythritol tetrastearate.

A light stabilizer can be added to the resin composition of the present invention. As such a light stabilizer, there can be mentioned, for example, 2-(2'-hydroxy-5'-tert-octylphenyl) benzotriazole, 2-(3-tert-butyl-5-methyl-2-hydroxyphenyl)-5-chlorobenzotriazole, 2-(5-methyl-2-hydroxyphenyl) benzotriazole, 2-[2-hydroxy-3,5-bis(α,α-dimethylbenzyl) phenyl]-2H-benzotriazole, 2,2'-methylenebis(4-cumyl-6-benzotriazolephenyl), 2,2'-p-phenylenebis(1,3-benzoxazine-4-one), 2-(3,5-di-tert-butyl-2-hydroxyphenyl) benzotriazole, 2-(3,5-di-tert-butyl-2-hydroxyphenyl)-5-chlorobenzotriazole, bis(2,2,6,6-tetramethyl-4-piperidyl) sebacate, bis(1,2,2,6,6-pentamethyl-4-piperidyl) sebacate, dimethyl succinate.1-(2-hydroxyethyl)-4-hydroxy-2,2,6,6-tetramethylpiperidine polycondensate, and bis(1,2,2,6,6- pentamethyl-4-piperidyl) 2-(3,5-di-tert-butyl-4-hydroxybenzyl)-2-n-butylmalonate. The amount of the light stabilizer used is preferably 0.01 to 2 parts by weight per 100 parts by weight of the resin component.

An antistatic agent can be added to the resin composition of the present invention. As such an antistatic agent, there can be mentioned, for example, polyetheresteramide, glycerine monostearate, ammonium dodecylbenzenesulfonate, phosphonium dodecylbenzenesulfonate, maleic anhydride monoglyceride and maleic anhydride diglyceride. The antistatic agent is used in an amount of preferably 0.5 to 20 parts by weight per 100 parts by weight of the resin component.

To the resin composition of the present invention can be added a flame retardant in order to allow the composition to have flame retardancy. As the flame retardant, there can be mentioned a halogenated bisphenol A polycarbonate type flame retardant, an organic salt type flame retardant, an aromatic phosphoric acid ester type flame retardant, a halogenated aromatic phosphoric acid ester type flame retardant, etc. At least one kind selected from these flame retardants can be blended. Specific examples of the halogenated bisphenol A polycarbonate type flame retardant are flame retardants of polycarbonate of tetrachlorobisphenol A, copolycarbonate of tetrachlorobisphenol A and bisphenol A, polycarbonate of tetrabromobisphenol A, and copolycarbonate of tetrabromobisphenol A and bisphenol A. Specific examples of the organic salt type flame retardant are dipotassium diphenylsulfone-3,3'-disulfonate, potassium diphenylsulfone-3-sulfonate, sodium 2,4,5-trichlorobenzenesulfonate, potassium 2,4,5-trichlorobenzenesulfonate, potassium bis(2,6-dibromo-4-cumylphenyl) phosphate, sodium bis(4-cumylphenyl) phosphate, potassium bis(p-toluenesulfone)imide, potassium bis(diphenylphosphoric acid)imide, potassium bis(2,4,6-tribromophenyl) phosphate, potassium bis(2,4-dibromophenyl) phosphate, potassium bis(4-bromophenyl) phosphate, potassium diphenyl phosphate, sodium diphenyl phosphate, potassium perfluorobutanesulfonate, sodium or potassium lauryl sulfate, and sodium or potassium hexadecyl sulfate. Specific examples of the halogenated aromatic phosphoric acid ester type flame retardant are tris(2,4,6-tribromophenyl) phosphate, tris(2,4-dibromophenyl) phosphate and tris(4-bromophenyl) phosphate. Specific examples of the aromatic phosphoric acid ester type flame retardant are triphenyl phosphate, tris(2,6-xylyl) phosphate, tetrakis(2,6-xylyl)resorcin diphosphate, tetrakis(2,6-xylyl) hydroquinone diphosphate, tetrakis(2,6-xylyl)-4,4'-biphenol diphosphate, tetraphenylresorcin diphosphate, tetraphenylhydroquione diphosphate, tetraphenyl-4,4'-biphenol diphosphate, aromatic polyphosphate of which the aromatic ring sources are resorcin and phenol and which contains no phenolic OH group, aromatic polyphosphate of which the aromatic ring sources are resorcin and phenol and which contains phenolic OH group, aromatic polyphosphate of which the aromatic ring sources are hydroquinone and phenol and which contains no phenolic OH group, aromatic polyphosphate of which the aromatic ring sources are hydroquinone and phenol and which contains phenolic OH group, ("aromatic polyphosphates" shown below refer to both of aromatic polyphosphates containing phenolic OH group and aromatic polyphosphates containing no phenolic OH group), aromatic polyphosphates of which the aromatic ring sources are bisphenol A and phenol, aromatic polyphosphates of which the aromatic ring sources are tetrabromobisphenol A and phenol, aromatic polyphosphates of which the aromatic ring sources are resorcin and 2,6-xylenol, aromatic polyphosphates of which the aromatic ring sources are hydroquinone and 2,6-xylenol, aromatic polyphosphates of which the aromatic ring source are bisphenol A and 2,6-xylenol, and aromatic polyphosphates of which the aromatic ring sources are tetrabromobisphenol A and 2,6-xylenol.

Of these flame retardants, preferred as the halogenated bisphenol A polycarbonate type flame retardant are those of polycarbonate of tetrabromobisphenol A and copolycarbonate of tetrabromobisphenol A and bisphenol A, and the polycarbonate of tetrabromobisphenol A is more preferred. Preferred as the organic salt type flame retardant are dipotassium diphenylsufone-3,3'-disulfonate, potassium diphenylsulfone-3-sulfonate and sodium 2,4,5-trichlorobenzenesulfonate; preferred as the aromatic phosphoric acid ester type flame retardant are triphenyl phosphate, tricresyl phosphate, cresyl diphenyl phosphate and resorcinol bis(dixylenyl phosphate).

As other flame retardants, the followings can be mentioned. First, a red phosphorus type flame retardant is mentioned. As the red phosphorus type flame retardant, there can be used ordinary red phosphorus and microencapsulated red phosphorus obtained by microencapsulating a surface of red phosphorus with a thermosetting resin and/or an inorganic material. The microencapsulated red phosphorus is preferably used in the form of master pellets for higher safety and workability. As the inorganic material used for microencapsulation, there can be mentioned magnesium hydroxide, aluminum hydroxide, titanium hydroxide, tin hydroxide, cerium hydroxide, etc., and as the thermosetting resin, there can be mentioned a phenol-formalin type resin, a urea-formalin type resin, a melamine-formalin type resin, etc. Further, double-coated red phosphorus obtained by coating red phosphorus with the above-mentioned inorganic material and further coating thereon the above-mentioned thermosetting resin can also be used preferably. Red phosphorus coated with electroless plating may be also used. As the electroless plating, there can be used a plating of a metal selected from nickel, cobalt, copper, iron, manganese, zinc and alloys thereof. Red phosphorus coated with electroless plating may be also covered with the above-mentioned inorganic material and thermosetting resin. The amount of component(s) used for microencapsulation, such as inorganic material, thermosetting resin or electroless plating is preferably 20% by weight or less, more preferably 5 to 15% by weight per 100% by weight of the red phosphorus type flame retardant. The amount exceeding 20% by weight is not preferred because, with such a high amount, adverse effects such as reduction in flame retardancy, reduction in mechanical properties and the like are more than advantageous effects such as suppression of phosphine formation, securement of safety and the like. The average particle diameter of the red phosphorus type flame retardant used is 1 to 100 $\mu$m, preferably 1 to 40 $\mu$m. As commercial products of the microencapsulated red phosphorus type flame retardant, there can be mentioned Novaexcel 140 and Novaexcel F-5 (brand names, products of Rinkagaku Kogyo Co., Ltd.), Hishiguard TP-10 (brand name, product of Nippon Chemical Industrial Co., Ltd.), Hostaflam RP 614 (brand name, product of Clariant Japan K.K.), etc.

Further, as halogen-containing flame retardants other than those mentioned previously, there can be mentioned a halogenated epoxy resin, a halogenated aromatic vinyl polymer, a halogenated cyanurate resin, a halogenated poly (phenylene ether), etc. Preferred are a brominated bisphenol type epoxy resin, a brominated bisphenol type phenoxy resin, a brominated polystyrene, a brominated crosslinked polystyrene, a brominated poly(phenylene ether), a poly (dibromophenylene ether), etc.

Further, there can also be used inorganic flame retardants such as inorganic phosphate [e.g. poly(ammonium phosphate)], aluminum hydroxide, magnesium hydroxide, dolomite, hydrotalcite, calcium hydroxide, barium hydroxide, basic magnesium carbonate, zirconium hydroxide, hydrate of inorganic metal compound (e.g. tin oxide hydrate), zinc borate, zinc metaborate, barium metaborate, zinc carbonate, magnesium carbonate, calcium carbonate, barium carbonate, magnesium oxide, molybdenum oxide, zirconium oxide, tin oxide, antimony oxide and the like.

As the flame retardant of the present invention, there can further be mentioned metal sulfides such as sulfides of group IIA elements, sulfides of group IIB elements, tin sulfide, iron sulfide, titanium sulfide, copper sulfide, bismuth sulfide and the like; element-sulfur; borates of group IA elements; phosphates of group IA elements; borates of group IIA elements; phosphates of group IIA elements; borophosphates of group IIA elements; borates of group IIB elements; phosphates of group IIB elements; borophosphates of group IIB elements; phosphates of group IVB elements; and metal phosphates such as aluminum phosphate, iron phosphate, bismuth phosphate, tin phosphate, zirconium phosphate, titanium phosphate and the like.

There can further be mentioned alkali metal salts or alkaline earth metal salts of inorganic acids, and halogen-containing compounds. As preferred inorganic alkali metal salts, there can be mentioned sodium salts, potassium salts, lithium salts, cesium salts, etc. As inorganic alkaline earth metal salts, there can be mentioned calcium salts, magnesium salts, etc. As the inorganic acids used in obtaining the above inorganic alkali metal salts or inorganic alkaline earth metal salts, there can be mentioned $H_3AlF_6$, $H_3BF_6$, $H_3SbF_6$, $H_2TiF_6$, $H_2SiF_6$, $H_3PO$, $H_2ZrF_6$, $H_2WF_6$, $HBF_4$, etc. Preferred inorganic alkali metal salts or inorganic alkaline earth metal salts, there can be mentioned $Na_3AlF_6$ and $Ca_3(AlF_6)_2$.

Further, an organosiloxane compound can be used also as a flame retardant. A such a silicon-based flame retardant, there can be mentioned those having a basic structure represented by the following formula (I).

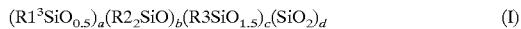

$$(R1^3SiO_{0.5})_a(R2_2SiO)_b(R3SiO_{1.5})_c(SiO_2)_d \qquad (I)$$

In the above general formula (I), R1, R2 and R3 are each a hydrocarbon group having 1 to 12 carbon atoms, and there can be mentioned, for example, an alkyl group having 1 to 12 carbon atoms, an alkenyl group having 2 to 12 carbon atoms, an aryl group having 6 to 12 carbon atoms, and an aralkyl group having 7 to 12 carbon atoms. Specific examples of the alkyl group are methyl group, ethyl group, n-propyl group, isopropyl group, various butyl groups, various hexyl groups, and cyclohexyl group; specific examples of the alkenyl group are vinyl group, allyl group and cyclohexenyl group; specific examples of the aryl group are phenyl group, naphthyl group and tolyl group; and specific examples of the aralkyl group are benzyl group, β-phenethyl group and 2-phenylpropyl group. Of these, phenyl group, vinyl group and methyl group can be used particularly preferably because they exhibit flame retardancy more effectively.

There can also be used a copolymer between a polycarbonate resin and an organosiloxane compound wherein R1, R2 and R3 are each a phenolic hydroxyl group-containing monovalent organic group. As the phenolic hydroxyl group-containing monovalent organic group, there can be mentioned, for example, 2-(o-hydroxyphenyl)ethyl group, 2-(p-hydroxyphenyl)ethyl group, 2-(m-hydroxyphenyl) ethyl group, 1-(o-hydroxyphenyl)ethyl group, 1-(p-hydroxyphenyl)ethyl group, 1-(m-hydroxyphenyl)ethyl group, 3-(o-hydroxyphenyl)propyl group, 3-(p-hydroxyphenyl)propyl group, 3-(m-hydroxyphenyl)propyl group, 2-(o-hydroxyphenyl)propyl group, 2-(p-hydroxyphenyl)propyl group and 2-(m-hydroxyphenyl) propyl group.

In the above general formula (I), a, b, c and d must satisfy $0 \leq a \leq 0.75$, $0 \leq b \leq 1$, $0 \leq c \leq 0.5$, $0 \leq d \leq 0.25$, and $(a+b+c+d) = 1$. Further, c and d must not be 0 (zero) simultaneously. Preferably, $0 \leq a \leq 0.5$ and $0.25 \leq b \leq 0.9$.

Such an organosiloxane compound has a dynamic viscosity of preferably 100 to 100,000 cS (centistokes), more preferably 200 to 10,000 cS at 25° C.

In the present invention, there can also be used, as the flame retardant, a phosphazene type flame retardant represented by a phenoxyphosphazene oligomer and a cyclic phenoxyphosphazene oligomer.

The amount of the flame retardant used differs depending upon the desired degree of flame retardancy, the kind of flame retardant used, etc. However, the amount is 0.1 to 25 parts by weight, preferably 0.5 to 15 parts by weight per 100 parts by weight of the resin component when the flame retardant used is a halogen-containing flame retardant (e.g. polycarbonate of halogenated bisphenol A), an aromatic phosphoric acid ester type flame retardant, an inorganic flame retardant, a red phosphorus type flame retardant, a silicon-containing flame retardant or a phosphazene type flame retardant, while the amount is 0.01 to 2 parts by weight, preferably 0.02 to 1 part by weight when the flame retardant used is an inorganic or organic alkali metal or alkaline earth metal salt.

To the resin composition of the present invention can also be added other resin or elastomer in a small amount.

As such other resin, there can be mentioned, for example, polyamide resin, polyimide resin, polyetherimide resin, polyurethane resin, poly(phenylene ether) resin, poly (phenylene sulfide) resin, polysulfone resin, polyolefin resin (e.g. polyethylene or polypropylene), polymethacrylate resin, phenolic resin and epoxy resin.

As the elastomer, there can be mentioned, for example, isobutylene rubber, isoprene rubber and silicone rubber.

The resin composition of the present invention can be produced by various methods. A mixing method using, for example, a tumbler, a V-shaped blender, a super mixer, a Nauta mixer, a Banbury mixer, a kneading roll, an extruder or the like is used appropriately. The resin composition produced can be, as it is or after having being pelletized by a melt kneader, made into a molded article according to a commonly known method such as injection molding, extrusion molding, compression molding or the like. In order to increase the dispersibility of other components in the aromatic polycarbonate resin component to obtain stable releasability and physical properties, it is preferred to use a twin-screw extruder in melt extrusion. For adding the fibrous filler or platy filler of the present invention, there can be used any of a method of adding the filler directly from the hopper of an extruder or at the middle of an extruder, a method of beforehand mixing the filler with the aromatic polycarbonate resin, a method of beforehand mixing the filler with part of the aromatic polycarbonate resin to prepare a master and adding the master, and a method of adding such a master at the middle of an extruder.

When the resin composition contains the aromatic polyester resin, the aromatic polycarbonate resin and the aromatic polyester resin are dried and the aromatic polyester resin is added at the middle of an extruder. This method is preferred in view of the strength obtained.

The thus-obtained resin composition-I is useful for use in the housings and chassis of OA appliances such as personal computer, word processor, facsimile, copier, printer and the like; internal parts of OA appliances represented by parts of optical disc drives (e.g. CD-ROM and DVD), such as tray, chassis, turn table, pick-up chassis, various gears and the like; housings and parts of home electric appliances such as TV, video, electric washer, electric dryer, electric cleaner and the like; electric tools such as power saw, electric drill and the like; parts of optical appliances such as telescope lens-barrel, microscope lens-barrel, camera body, camera housing, camera lens-barrel, interior parts of laser beam printer and the like; and automobile parts such as door handle, pillar, bumper, instrument panel and the like.

EXPLANATION OF NUMERALS

1: Center of C-shaped double circles

Figure 1:
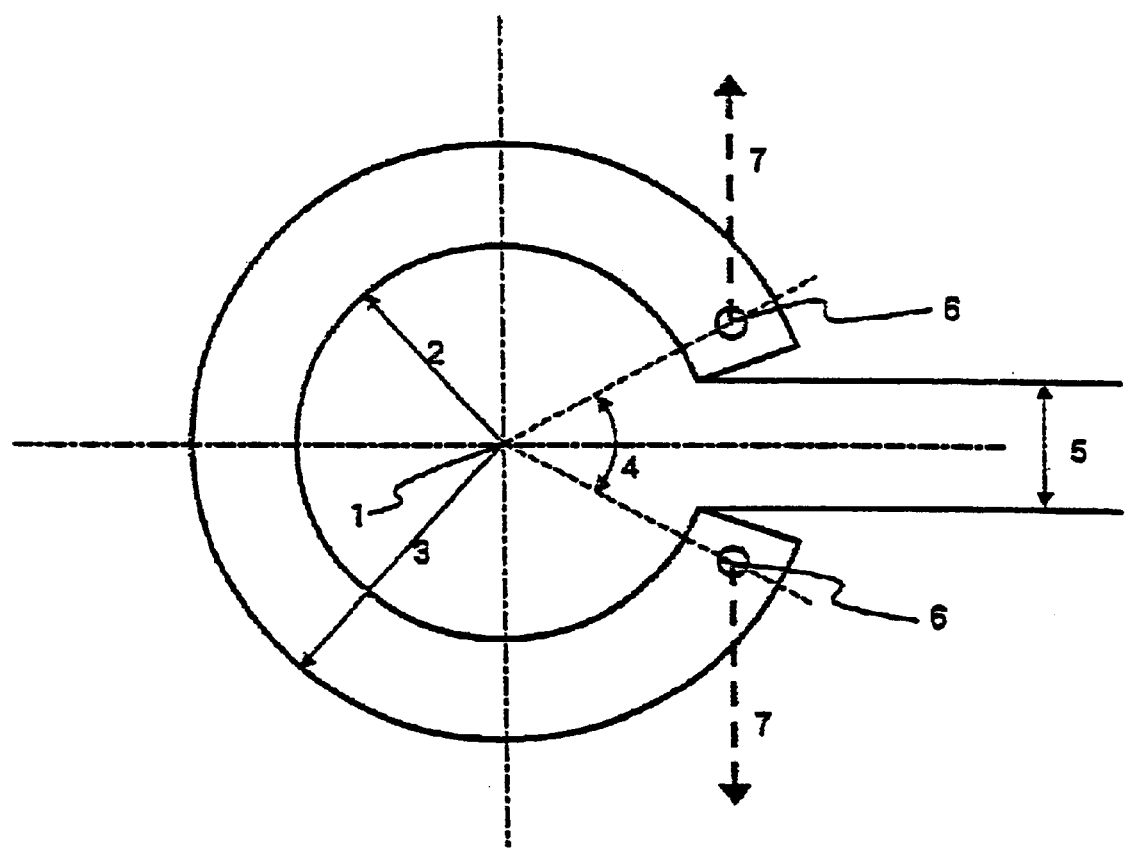
FIG. 1 is a front view of a so-called C type sample which was used for evaluation of wet heat fatigue. The thickness of the sample is 3 mm. A jig of a tester is passed through each hole shown by numeral 6; a given load is applied in a perpendicular direction shown by numeral 7; in this state, a test for wet heat fatigue is conducted.

2: Radius (20 mm) of inner circle of double circles

3: Radius (30 mm) of outer circle of double circles

4: Central angle (60°) showing the positions of holes for fitting jigs

5: Gap (13 mm) between the ends of sample

6: Hole for fitting of jig (a circle of 4 mm in diameter, located in the middle of sample width)

7: Direction of load applied to sample during fatigue test

EXAMPLES

The present invention will be described in more detail below by way of Examples. In the Examples, parts and % refer to parts by weight and % by weight, respectively. Evaluation items and symbols of components in resin composition denote the following matters.

(I) Evaluation Items (1) Relative fluorescence intensity

An aromatic polycarbonate resin and a standard substance were each measured for fluorescence intensity at 465 nm under the following conditions, and the ratio of the obtained intensities [relative fluorescence intensity=(fluorescence intensity of aromatic polycarbonate resin)/(fluorescence intensity of standard substance)] was calculated.

Measurement conditions

Apparatus: Hitachi F 4500

Lamp: Xe, 150 W

Slit width: Ex/Em each 2.5 mm

Photomultiplier: 400 W

Sample (conc.): 1 mg of aromatic polycarbonate resin in 5 ml of methylene chloride Comparison standard substance: $1.0 \times 10^{-3}$ mg of phenyl salicylate in 1 ml of methylene chloride (2) Residual catalytic activity index Index of residual catalytic activity was measured as follows. A sample was beforehand vacuum-dried at 120° C. for 4 hours and then used for the measurement. As a tester was used RDA-II (a viscoelasticity tester produced by Rheometrics Far East Ltd.). A jig (a cone-circular plate type having a diameter of 25 mm) was mounted in the tester. A measurement temperature was set to 270° C. in a nitrogen current, which satisfies the use conditions of the tester for measuring the sample. The measurement temperature was set by measuring the temperature inside the oven of the tester. Then, a dried sample was set in the jig and allowed to stand until the whole sample sufficiently reached the measurement temperature. Thereafter, the jig was rotated at an angular velocity of 1 rad/sec to start measurement. This was continued for 30 minutes and the change of the melt viscosity of the sample was observed during the measurement. Thereby, the melt viscosities of the sample after 5 minutes and 30 minutes from the start of the rotation were measured. The change of melt viscosity per minute was calculated from the obtained values using the following equation (i), and it was used as the residual catalytic activity index.

Residual catalytic activity index (%)=|(melt viscosity after 30 minutes)−(melt viscosity after 5 minutes)|÷[(melt viscosity after 5 minutes)×25]×100   (i)

(3) Terminal hydroxyl group concentration 0.02 gram of a sample was dissolved in 0.4 ml of chloroform, and measured for terminal hydroxyl groups and terminal phenyl groups at 20° C. by $^1$H-NMR (EX-270 of Japan Electron Optical Laboratory Co., Ltd.). The terminal hydroxyl group concentration of the sample was calculated from the following equation (ii).

Terminal hydroxyl group concentration (mole %)=(number of terminal hydroxyl groups/number of total terminals)×100   (ii)

(4) Wet heat fatigue-I

A so-called C type sample for measurement, shown in FIG. 1 was used. The number of times until the sample caused breakage was determined with a fatigue tester (Shimadzu Servopulser EHF-EC5, produced by Shimadzu Corporation), in an atmosphere of 80° C. and 90% RH under the conditions of a frequency of 1 Hz (a sine wave) and the maximum load of 5 kg.

(5) Wet heat fatigue-II

A so-called C type sample for measurement, shown in FIG. 1 was used. The number of times until the sample caused breakage was determined using a fatigue tester (Shimadzu Servopulser EHF-EC5, produced by Shimadzu Corporation), in an atmosphere of 80° C. and 90% RH under the conditions of a frequency of 1 Hz (a sine wave) and the maximum load of 2 kg.

(6) Retention of wet heat strength

A sample for tensile test, used in ASTM D 638 was subjected to a wet heat treatment at 80° C. at 90% RH for 1,000 hours using an environment tester (Platinas PSL-2FPH produced by Tabai Espec Corp.) and then, measured for tensile strength, followed by calculation of the retention of wet heat strength of the sample from the following equation.

Retention (%)=[(strength of sample subjected to wet heat treatment)/(strength of untreated sample)]×100

(7) Impact resistance of flat property

Using a square sheet (15 cm×15 cm×2 mm) for measurement, impact resistance of flat was measured according to JIS K 7211, under the following conditions.

Weight: a ball of about 63 mm in diameter and 1 kg in weight

Test temperature: 40° C.

A weight was dropped onto the square sheet for measurement from various heights of 5 cm intervals to examine a height (cm) at which the square sheet caused cracking.

(8) Rigidity

Flexural modulus of elasticity was measured ccording to ASTM D 790.

(9) Tensile strength

A tensile test was conducted according to ASTM D 638 to measure the tensile strength at break of sample.

(10) Notched impact

A weight was allowed to exert an impact on a specimen of 3.2 mm in thickness from the notch side according to ASTM D 256 to conduct the impact measurement of the specimen.

(11) Specific gravity

Measured according to JIS K 7112.

(12) Weld strength

A Type-1 specimen was measured for tensile strength (S1) according to ASTM D 638. Then, a specimen having the same shape as the Type-1 specimen but having a weld line at the center portion (produced using the same cavity as used for production of the type-1 specimen but giving gates at the both ends of the specimen) was measured for tensile strength (S2) in the same manner. Using the strength S1 and S2, the retention of weld portion was calculated from the following equation to evaluate the strength of the weld portion.

Strength retention (%)=(S2/S1)×100

(13) Flowability

Flowability was measured under the conditions of cylinder temperature=270° C., mold temperature=80° C. and injection pressure=1,200 kgf/cm$^2$, using Archimedes type spiral flow of 2 mm in thickness and 8 mm in width.

(14) Chemical resistance

1% strain was applied to a sample for tensile test used in ASTM D 638. After immersed in a regular gasoline (a product of ESSO) in 30° C. for 3 minutes, the resulting sample was measured for tensile strength and the retention of tensile strength was calculated from the following equation.

Retention (%)=[(strength of treated sample)/(strength of untreated sample)]×100

(II) Symbols of the Individual Components Used in Composition (a) Aromatic polycarbonate resin (A-1 component)
(1) production of aromatic polycarbonate resin (A-1 component), EX-PC Into a reactor equipped with a stirrer, distillation column and decompression device were fed 228 parts by weight of bisphenol A, 220 parts by weight of diphenyl carbonate and an ester interchange catalyst consisting of disodium salt of bisphenol A (1.36×10$^{-5}$ parts by weight, 0.1 μmol (as Na) per mol of bisphenol A) and tetramethylammonium hydroxide (9.1×10$^{-3}$ parts by weight, 100 μmol per mol of bisphenol A). The inside of the reactor was purged with nitrogen and then, the reactor contents were made into a solution at 140° C. Stirring was conducted for 30 minutes. Thereafter, the reactor inside temperature was elevated to 180° C. and a reaction was allowed to take place at an inside pressure of 100 mmHg for 30 minutes, and the phenol formed was removed by distillation. Next, the reactor inside temperature was gradually elevated to 200° C. and the reactor inside pressure was gradually reduced to 50 mmHg and a reaction was allowed to take place at the above temperature and pressure for 30 minutes while removing phenol by distillation. Further, the temperature was gradually elevated to 220° C. and the pressure was gradually reduced to 30 mmHg and a reaction was conducted at the above temperature and pressure for 30 minutes. Furthermore, the temperature was gradually elevated to 240° C. and the pressure was gradually reduced to 10 mmHg and a reaction was conducted at the above temperature and pressure for 30 minutes. Again, the temperature was gradually elevated to 250° C. and the pressure was gradually reduced to 1 mmHg and a reaction was conducted at the above temperature and pressure for 30 minutes.

Finally, polycondensation of polycarbonate was continued at 250 to 255° C. (care was taken to keep the temperature at 255° C. or below) while maintaining a value, obtained by dividing the stirring shear rate (unit: 1/sec) of a stirrer vane of the polymerization reactor by the square of the radius (unit: cm) of the stirrer vane, at 0.001 (1/(sec×cm$^2$))

After the completion of polycondensation, 3.1 part of 2-methoxycarbonylphenyl carbonate (as a terminal-blocking agent) was added. Then, a terminal-blocking reaction was conducted at 255° C. at 1 Torr or less for 10 minutes. Thereafter while the reaction system remained in a molten state, 0.00029 part (5×10$^{-7}$ mol per mol of bisphenol) of tetrabutylphosphonium dodecylbenzenesulfonate was added as a catalyst deactivator, and a reaction was conducted at 255° C. at 10 Torr or less to obtain an aromatic polycarbonate resin having a viscosity-average molecular weight of 23,300, a terminal hydroxyl group concentration of 6 mole %, a relative fluorescence intensity of 1×10$^{-3}$ and a residual catalytic activity index of 0.03. This aromatic polycarbonate resin was transferred to an extruder using a gear pump. 0.003% by weight of tris(nonylphenyl) phosphite and 0.05% by weight of trimethyl phosphate were added at the middle of the extrusion to obtain aromatic polycarbonate resin pellets.

(2) Production of aromatic polycarbonate resin for comparison, CEX-PC

Into a reactor equipped with stirrer, distillation column and decompression device were fed 228 parts by weight of bisphenol A, 220 parts by weight of diphenyl carbonate and an ester interchange catalyst consisting of disodium salt of bisphenol A (1.36×10$^{-3}$ parts by weight, 10 μmol (as Na) per mol of bisphenol A) and tetramethylammonium hydroxide (9.1×10$^{-3}$ parts by weight, 100 μmol per mol of bisphenol A). The inside of the reactor was purged with nitrogen and then, reactor contents were made into a solution at 140° C. Stirring was conducted for 30 minutes. Thereafter, the reactor inside temperature was elevated to 180° C. and a reaction was allowed to take place at an inside pressure of 100 mmHg for 30 minutes, and the phenol formed was removed by distillation. Next, the reactor inside temperature was gradually elevated to 200° C. and the reactor inside pressure was gradually reduced to 50 mmHg and a reaction was allowed to take place at the above temperature and pressure for 30 minutes while removing phenol by distillation. Further, the temperature was gradually elevated to 220° C. and the pressure was gradually reduced to 30 mmHg and a reaction was conducted at the above temperature and pressure for 30 minutes. Furthermore, the temperature was gradually elevated to 240° C. and the pressure was gradually reduced to 10 mmHg and a reaction was conducted at the above temperature and pressure for 30 minutes. Again, the temperature was gradually elevated to 250° C. and the pressure was gradually reduced to 1 mmHg and a reaction was conducted at the above temperature and pressure for 30 minutes.

Finally, polycondensation of polycarbonate was continued at 280 to 285° C. to obtain a polymer. This aromatic polycarbonate resin had a viscosity-average molecular weight of 23,000, a terminal hydroxyl group concentration of 50 mole %, a relative fluorescence intensity of 6×10$^{-3}$ and a residual catalytic activity index of 3.1.

(b) Styrene-based resin (A-2 component)
(1) Styrene-butadiene-acrylonitrile copolymer: Santac UT-61, a product of Mitsui Chemicals, Inc. (hereinafter referred to as ABS).
(2) Styrene-acrylonitrile copolymer: Styrac-AS 767 R27, a product of Asahi Chemical Industry Co., Ltd. (hereinafter referred to as AS).
(3) Methyl (meth)acrylate-butadiene-styrene copolymer: Kane Ace B-56, a product of Kaneka Corporation (hereinafter referred to as MBS).

(c) Aromatic polyester resin (A-3 component)
(1) Polyethylene terephthalate: TR-8580, a product of Teijin Limited, having a intrinsic viscosity of 0.8 (hereinafter referred to as PET).
(2) Polybutylene terephthalate: TRB-H, a product of Teijin Limited, having an intrinsic viscosity of 1.07 (hereinafter referred to as PBT).

(d) Elastomeric polymer (A-4 component)
(1) Butadiene-alkyl acrylate-alkyl methacrylate copolymer: EXL-2602, a product of Kureha Chemical Industry Co., Ltd. (hereinafter referred to as E-1).
(2) Composite rubber comprising a polyorganosiloxane component and a poly[alkyl (meth)acrylate] rubber component, which interpenetrate each other to form a network structure: S-2001, a product of Mitsubishi Rayon Co., Ltd. (hereinafter referred to as E-2).

(e) Reinforcing filler (B-1 component or B-2 component)
(1) Glass fiber: chopped strand ECS-03T-511, a product of Nippon Electric Glass Co., Ltd., subjected to urethane binding treatment, fiber diameter=13 μm (abbreviated to "G" in some cases).
(2) Carbon fiber: Besfight HTA-C6-U, a product of Toho Rayon Co., Ltd., PAN-series, subjected to epoxy binding treatment, fiber diameter=7 μm.
(3) Wollastonite: Sicatec NN-4, a product of Tomoe Engineering Co., Ltd., average particle diameter D=4 μm, distribution of particles having particle diameters of 3 μm or more=82.5%, distribution of particles having particle diameters of 10 μm or more=0.7%, aspect ratio L/D=20 (abbreviated to "W" in some cases).
(4) GFL: glass flakes REFG-101, a product of Nippon Sheet Glass Co., Ltd., average particle diameter L=600 μm, L/D=120.

(5) mica: A-41, a product of K. K. Yamaguchi Unmo Kogyosho, average particle diameter L=40 μm, L/D=70.
(6) Talc: P-3, a product of Nippon Talc Co., Ltd., average particle diameter L=5 μm, L/D=8 (abbreviated to "T" in some cases).
(f) Olefinic wax having carboxyl group and/or carboxylic acid anhydride group
(1) Olefinic wax obtained by copolymerization of α-olefin and maleic anhydride: Diacarna PA30, a product of Mitsubishi Chemical Corporation, maleic anhydride content=10% by weight (hereinafter abbreviated to WAX in some cases).

Examples 1–3 and Comparative Examples 1–2

One of the aromatic polycarbonate resins obtained above and a component shown in Table 1 were uniformly mixed using a tumbler. The mixture was pelletized through a vented (30 mm in diameter) twin-screw extruder (KTX-30 produced by Kobe Steel, Ltd.) at a cylinder temperature of 270° C. with degassing at a vacuum of 10 mmHg. The pellets were dried at 120° C. for 5 hours and passed through an injection molding machine (SG150U produced by Sumitomo Heavy Industries, Ltd.) under the conditions of cylinder temperature=330° C. and mold temperature=100° C. to produce a molded sheet for measurement.

As is apparent from Table 1, the aromatic polycarbonate resin compositions of Examples of the present invention, which were composed of an aromatic polycarbonate resin having a relative fluorescence intensity and a glass fiber are superior in those properties primarily expected for glass fiber-containing resin compositions and further, superior in wet heat fatigue and impact resistance of flat in particular, as compared with the resin composition of Comparative Example 2 using an aromatic polycarbonate resin having a high relative fluorescence intensity.

TABLE 1

|  |  |  |  | Ex.1 | Ex.2 | Ex.3 | C.Ex.1 | C.Ex.2 |
|---|---|---|---|---|---|---|---|---|
| composition | (a) | EX-PC | parts by weight | 100 | 100 | 100 | 100 |  |
|  |  | CEX-PC | parts by weight |  |  |  |  | 100 |
|  | (e) | glass fiber | parts by weight | 20 | 50 | 80 |  | 50 |
| properties |  | relative fluorescence intensity | — | $1.0 \times 10^{-3}$ | $1.0 \times 10^{-3}$ | $1.0 \times 10^{-3}$ | $1.0 \times 10^{-3}$ | $6.0 \times 10^{-3}$ |
|  |  | residual catalytic activity index | % | 0.03 | 0.03 | 0.03 | 0.03 | 3.1 |
|  |  | terminal hydroxyl group concentration | mole % | 6 | 6 | 6 | 6 | 50 |
|  |  | wet heat fatigue-(I) | times | $1.7 \times 10^4$ | $4.1 \times 10^4$ | $7.8 \times 10^4$ | $1.4 \times 10^2$ | $1.6 \times 10^4$ |
|  |  | impact resistance of flat | cm | 10 | 25 | 30 | 80 | 20 |
|  |  | rigidity | kgf/cm² | 51,000 | 77,000 | 102,000 | 22,000 | 76,000 |
|  |  | tensile strength | kgf/cm² | 850 | 1,300 | 1,350 | 620 | 1,250 |

Ex.: Example
C.Ex.: Comparative Example

Examples 4–6 and Comparative Example 3

One of the aromatic polycarbonate resins obtained above and a component shown in Table 2 were uniformly mixed using a tumbler. The subsequent operation was conducted in the same manner as in Example 1, to produce a molded sheet. For reference, the properties of the molded sheet of the above Comparative Example 1 are also shown.

As is apparent from Table 2, the aromatic polycarbonate resin compositions of Examples of the present invention, which were composed of an aromatic polycarbonate resin having a relative fluorescence intensity and a carbon fiber are superior in those properties primarily expected for carbon fiber-containing resin compositions and further, superior in wet heat fatigue and impact resistance of flat in particular, as compared with the resin composition of Comparative Example 3 using an aromatic polycarbonate resin having a high relative fluorescence intensity.

TABLE 2

|  |  |  |  | Ex.4 | Ex.5 | Ex.6 | C.Ex.1 | C.Ex.3 |
|---|---|---|---|---|---|---|---|---|
| composition | (a) | EX-PC | parts by weight | 100 | 100 | 100 | 100 |  |
|  |  | CEX-PC | parts by weight |  |  |  |  | 100 |
|  | (e) | carbon fiber | parts by weight | 15 | 25 | 45 |  | 25 |
| properties |  | relative fluorescence intensity | — | $1.0 \times 10^{-3}$ | $1.0 \times 10^{-3}$ | $1.0 \times 10^{-3}$ | $1.0 \times 10^{-3}$ | $6.0 \times 10^{-3}$ |
|  |  | residual catalytic activity index | % | 0.03 | 0.03 | 0.03 | 0.03 | 3.1 |
|  |  | terminal hydroxyl group concentration | mole % | 6 | 6 | 6 | 6 | 50 |
|  |  | wet heat fatigue-(I) | times | $2.1 \times 10^4$ | $8.4 \times 10^4$ | $3.2 \times 10^5$ | $1.4 \times 10^2$ | $6.6 \times 10^4$ |
|  |  | impact resistance of flat | cm | 30 | 35 | 40 | 80 | 25 |
|  |  | rigidity | kgf/cm² | 79,000 | 105,000 | 150,000 | 22,000 | 102,000 |
|  |  | notched impact | kgfcm/cm | 8 | 7 | 7 | 85 | 5 |
|  |  | specific gravity | — | 1.25 | 1.29 | 1.33 | 1.20 | 1.29 |

Ex.: Example
C.Ex.: Comparative Example

Examples 7–9 and Comparative Example 4

One of the aromatic polycarbonate resins obtained above and a component shown in Table 3 were uniformly mixed using a tumbler. The subsequent operation was conducted in the same manner as in Example 1, to produce a molded sheet. For reference, the properties of the molded sheet of the above Comparative Example 1 are also shown.

As is apparent from Table 3, the aromatic polycarbonate resin compositions of Examples of the present invention, which were composed of an aromatic polycarbonate resin having a relative fluorescence intensity and wollastonite are superior in those properties primarily expected for wollastonite-containing resin compositions and further, superior in wet heat fatigue and impact resistance of flat in particular, as compared with the resin composition of Comparative Example 4 using an aromatic polycarbonate resin having a high relative fluorescence intensity.

using a tumbler. The mixture was pelletized through a vented (30 mm in diameter) twin-screw extruder (KTX-30 produced by Kobe Steel, Ltd.) at a cylinder temperature of 270° C. with degassing at a vacuum of 10 mmHg. The pellets were dried at 120° C. for 5 hours and passed through an injection molding machine (SG150U produced by Sumitomo Heavy Industries, Ltd.) under the conditions of cylinder temperature=330° C. and mold temperature=100° C. to produce a molded sheet for measurement. For reference, the properties of the molded sheet of the Comparative Example 1 are also shown.

As is apparent from Table 4, the resin compositions of Examples, which were composed of glass flakes and an aromatic polycarbonate resin whose relative fluorescence intensity was in the range specified by the present invention are superior in the properties primarily expected for glass flake-containing resin compositions and further, superior in wet heat fatigue and weld strength in particular, as compared

TABLE 3

|  |  |  |  | Ex.7 | Ex.8 | Ex.9 | C.Ex.1 | C.Ex.4 |
|---|---|---|---|---|---|---|---|---|
| composition | (a) | EX-PC | parts by weight | 100 | 100 | 100 | 100 |  |
|  |  | CEX-PC | parts by weight |  |  |  |  | 100 |
|  | (e) | wollastonite | parts by weight | 20 | 50 | 80 |  | 50 |
| properties |  | relative fluorescence intensity | — | $1.0 \times 10^{-3}$ | $1.0 \times 10^{-3}$ | $1.0 \times 10^{-3}$ | $1.0 \times 10^{-3}$ | $6.0 \times 10^{-3}$ |
|  |  | residual catalytic activity index | % | 0.03 | 0.03 | 0.03 | 0.03 | 3.1 |
|  |  | terminal hydroxyl group concentration | mole % | 6 | 6 | 6 | 6 | 50 |
|  |  | wet heat fatigue-(I) | times | $1.0 \times 10^4$ | $3.5 \times 10^4$ | $4.3 \times 10^4$ | $1.4 \times 10^2$ | $2.0 \times 10^4$ |
|  |  | impact resistance of flat | cm | 15 | 30 | 35 | 80 | 25 |
|  |  | tensile strength | kgf/cm² | 450 | 640 | 720 | 630 | 610 |
|  |  | rigidity | kgf/cm² | 51,000 | 76,000 | 91,000 | 22,000 | 75,000 |
|  |  | notched impact | kgfcm/cm | 7 | 8 | 9 | 85 | 5 |

Ex.: Example
C.Ex.: Comparative Example

Examples 10–12 and Comparative Example 5

One of the aromatic polycarbonate resins obtained above and a component shown in Table 4 were uniformly mixed with the resin composition of Comparative Example 5 using a resin whose relative fluorescence intensity was outside the range of the present invention.

TABLE 4

|  |  |  |  | Ex.10 | Ex.11 | Ex.12 | C.Ex.1 | C.Ex.5 |
|---|---|---|---|---|---|---|---|---|
| composition | (a) | EX-PC | parts by weight | 100 | 100 | 100 | 100 |  |
|  |  | CEX-PC | parts by weight |  |  |  |  | 100 |
|  | (e) | GFL | parts by weight | 20 | 50 | 80 |  | 50 |
| properties |  | relative fluorescence intensity | — | $1.0 \times 10^{-3}$ | $1.0 \times 10^{-3}$ | $1.0 \times 10^{-3}$ | $1.0 \times 10^{-3}$ | $6.0 \times 10^{-3}$ |
|  |  | residual catalytic activity index | % | 0.03 | 0.03 | 0.03 | 0.03 | 3.1 |
|  |  | terminal hydroxyl group concentration | mole % | 6 | 6 | 6 | 6 | 50 |
|  |  | wet heat fatigue-(I) | times | $8.2 \times 10^3$ | $1.0 \times 10^4$ | $1.2 \times 10^4$ | $1.4 \times 10^2$ | $9.1 \times 10^3$ |
|  |  | weld strength | % | 80 | 75 | 70 | 95 | 60 |
|  |  | rigidity | kgf/cm$^2$ | 48,000 | 66,000 | 94,000 | 22,000 | 64,000 |
|  |  | tensile strength | kgf/cm$^2$ | 600 | 820 | 900 | 620 | 780 |
|  |  | notched impact | kgfcm/cm | 5 | 6 | 7 | 85 | 4 |
|  |  | specific gravity | — | 1.33 | 1.44 | 1.58 | 1.2 | 1.44 |

Ex.: Example
C.Ex.: Comparative Example

Examples 13–15 and Comparative Example 6

One of the aromatic polycarbonate resins obtained above and a component shown in Table 5 were uniformly mixed using a tumbler. The subsequent operation was conducted in the same manner as in Example 10, to produce a molded sheet. For reference, the properties of the molded sheet of the above Comparative Example 1 are also shown.

As is apparent from Table 5, the resin compositions of Examples, which were composed of mica and an aromatic polycarbonate resin whose relative fluorescence intensity was in the range specified by the present invention are superior in the properties primarily expected for mica-containing resin compositions and further, superior in wet heat fatigue and weld strength in particular, as compared with the resin composition of Comparative Example 6 using a resin whose relative fluorescence intensity was outside the range of the present invention.

Examples 16–18 and Comparative Example 7

One of the aromatic polycarbonate resins obtained above and a component shown in Table 6 were uniformly mixed using a tumbler. The subsequent operation was conducted in the same manner as in Example 10, to produce a molded sheet. For reference, the properties of the molded sheet of the above Comparative Example 1 are also shown.

As is apparent from Table 6, the resin compositions of Examples, which were composed of talc and an aromatic polycarbonate resin whose relative fluorescence intensity was in the range specified by the present invention are superior in the properties primarily expected for talc-containing resin compositions and further, superior in wet heat fatigue and weld strength in particular, as compared with the resin composition of Comparative Example 7 using a resin whose relative fluorescence intensity was outside the range of the present invention.

TABLE 5

|  |  |  |  | Ex.13 | Ex.14 | Ex.15 | C.Ex.1 | C.Ex.6 |
|---|---|---|---|---|---|---|---|---|
| composition | (a) | EX-PC | parts by weight | 100 | 100 | 100 | 100 |  |
|  |  | CEX-PC | parts by weight |  |  |  |  | 100 |
|  | (e) | mica | parts by weight | 15 | 25 | 45 |  | 25 |
| properties |  | relative fluorescence intensity | — | $1.0 \times 10^{-3}$ | $1.0 \times 10^{-3}$ | $1.0 \times 10^{-3}$ | $1.0 \times 10^{-3}$ | $6.0 \times 10^{-3}$ |
|  |  | residual catalytic activity index | % | 0.03 | 0.03 | 0.03 | 0.03 | 3.1 |
|  |  | terminal hydroxyl group concentration | mole % | 6 | 6 | 6 | 6 | 50 |
|  |  | wet heat fatigue-(I) | times | $8.2 \times 10^3$ | $1.0 \times 10^4$ | $1.2 \times 10^4$ | $1.4 \times 10^2$ | $9.0 \times 10^3$ |
|  |  | weld strength | % | 58 | 55 | 52 | 95 | 50 |
|  |  | rigidity | kgf/cm$^2$ | 38,000 | 61,000 | 90,000 | 22,000 | 59,000 |
|  |  | tensile strength | kgf/cm$^2$ | 760 | 800 | 840 | 620 | 770 |
|  |  | notched impact | kgfcm/cm | 3 | 3 | 3 | 85 | 2 |
|  |  | specific gravity | — | 1.28 | 1.37 | 1.46 | 1.2 | 1.37 |

Ex.: Example
C.Ex.: Comparative Example

TABLE 6

|  |  |  |  | Ex.16 | Ex.17 | Ex.18 | C.Ex.1 | C.Ex.7 |
|---|---|---|---|---|---|---|---|---|
| composition | (a) | EX-PC | parts by weight | 100 | 100 | 100 | 100 | |
|  |  | CEX-PC | parts by weight |  |  |  |  | 100 |
|  | (e) | talc | parts by weight | 20 | 50 | 80 |  | 50 |
| properties |  | relative fluorescence intensity | — | $1.0 \times 10^{-3}$ | $1.0 \times 10^{-3}$ | $1.0 \times 10^{-3}$ | $1.0 \times 10^{-3}$ | $6.0 \times 10^{-3}$ |
|  |  | residual catalytic activity index | % | 0.03 | 0.03 | 0.03 | 0.03 | 3.1 |
|  |  | terminal hydroxyl group concentration | mole % | 6 | 6 | 6 | 6 | 50 |
|  |  | wet heat fatigue-(I) | times | $5.4 \times 10^{3}$ | $8.0 \times 10^{3}$ | $1.1 \times 10^{4}$ | $1.4 \times 10^{2}$ | $6.9 \times 10^{4}$ |
|  |  | weld strength | % | 65 | 60 | 56 | 95 | 56 |
|  |  | rigidity | kgf/cm$^2$ | 25,000 | 48,000 | 58,000 | 22,000 | 46,000 |
|  |  | tensile strength | kgf/cm$^2$ | 640 | 700 | 760 | 620 | 680 |
|  |  | notched impact | kgfcm/cm | 5 | 5 | 4 | 85 | 3 |
|  |  | specific gravity | — | 1.26 | 1.37 | 1.46 | 1.2 | 1.37 |

Ex.: Example
C.Ex.: Comparative Example

Examples 19–33 and Comparative Examples 8–21

One of the aromatic polycarbonate resins obtained above and other component(s) shown in Table 7 were uniformly mixed using a tumbler. The mixture was pelletized through a vented (30 mm in diameter) twin-screw extruder (KTX-30 produced by Kobe Steel, Ltd.) at a cylinder temperature of 260° C. with degassing at a vacuum of 10 mmHg. The pellets were dried at 120° C. for 5 hours and passed through an injection molding machine (SG150U produced by Sumitomo Heavy Industries, Ltd.) under the conditions of cylinder temperature=270° C. and mold temperature=80° C. to produce a molded sheet for measurement. For reference, the properties of the molded sheet of the above Comparative Example 1 are also shown.

As is apparent from Table 7 by comparing Examples 20–25 with Comparative Examples 8–13 and also comparing Examples 26–33 with Comparative Examples 14–21, the thermoplastic resin compositions of Examples, which were composed of a styrene-based resin(s) and an aromatic polycarbonate resin whose relative fluorescence intensity was in the range of the present invention are superior in fatigue strength under high temperature and high humidity (wet heat fatigue) and tensile strength after high-temperature and high-humidity treatment (retention of wet heat strength) in particular and further are high in impact strength, as compared with the resin compositions of Comparative Examples using an aromatic polycarbonate resin whose relative fluorescence intensity was outside the range of the present invention.

TABLE 7

|  |  |  |  | Ex.19 | Ex.20 | Ex.21 | Ex.22 | Ex.23 | Ex.24 | Ex.25 |
|---|---|---|---|---|---|---|---|---|---|---|
| composition | (a) | EX-PC | % by weight | 25 | 60 | 75 | 90 | 70 | 70 | 70 |
|  | (b) | ABS | % by weight | 75 | 40 | 25 |  | 20 | 20 |  |
|  |  | AS | % by weight |  |  |  | 10 | 10 |  | 20 |
|  |  | MBS | % by weight |  |  |  |  |  | 10 | 10 |
| properties |  | total | parts of weight | 100 | 100 | 100 | 100 | 100 | 100 | 100 |
|  |  | wet heat fatigue-(II) | times | $1.7 \times 10^{3}$ | $1.8 \times 10^{3}$ | $2.4 \times 10^{3}$ | $2.3 \times 10^{3}$ | $2.4 \times 10^{3}$ | $2.6 \times 10^{3}$ | $2.2 \times 10^{3}$ |
|  |  | retention of wet heat strength | % | 91 | 87 | 88 | 86 | 86 | 87 | 87 |
|  |  | flowability | cm | 74 | 54 | 36 | 26 | 40 | 35 | 33 |
|  |  | notched impact | kgfcm/cm | 40 | 57 | 70 | 35 | 53 | 78 | 67 |

|  |  |  |  | C.Ex.1 | C.Ex.8 | C.Ex.9 | C.Ex.10 | C.Ex.11 | C.Ex.12 | C.Ex.13 |
|---|---|---|---|---|---|---|---|---|---|---|
| composition | (a) | EX-PC | % by weight | 100 |  |  |  |  |  |  |
|  |  | CEX-PC | % by weight |  | 60 | 75 | 90 | 70 | 70 | 70 |
|  | (b) | ABS | % by weight |  | 40 | 25 |  | 20 | 20 |  |
|  |  | AS | % by weight |  |  |  | 10 | 10 |  | 20 |
|  |  | MBS | % by weight |  |  |  |  |  | 10 | 10 |
| properties |  | total | parts by weight | 100 | 100 | 100 | 100 | 100 | 100 | 100 |
|  |  | wet heat fatigue-(II) | times | $5.4 \times 10^{3}$ | $4.3 \times 10^{2}$ | $6.3 \times 10^{2}$ | $7.4 \times 10^{2}$ | $7.1 \times 10^{2}$ | $6.8 \times 10^{2}$ | $6.9 \times 10^{2}$ |
|  |  | retention of wet heat strength | % | 32 | 26 | 22 | 20 | 24 | 23 | 22 |
|  |  | flowability | cm | 12 | 58 | 38 | 24 | 39 | 38 | 33 |

TABLE 7-continued

|  |  |  |  |  |  |  |  |  |  |
|---|---|---|---|---|---|---|---|---|---|
|  | notched impact | kgfcm/cm | 85 | 32 | 40 | 24 | 36 | 43 | 37 |

|  |  |  |  | Ex.26 | Ex.27 | Ex.28 | Ex.29 |
|---|---|---|---|---|---|---|---|
| composition | (a) | EX-PC | % by weight | 60 | 60 | 60 | 60 |
|  | (b) | ABS | % by weight | 40 | 40 | 40 | 40 |
|  |  | AS | % by weight |  |  |  |  |
|  |  | MBS | % by weight |  |  |  |  |
|  | total |  | parts by weight | 100 | 100 | 100 | 100 |
|  | (e) | G | parts by weight | 15 | 30 |  |  |
|  |  | W | parts by weight |  |  | 15 | 15 |
|  |  | T | parts by weight |  |  |  |  |
|  | (f) | WAX | parts by weight |  |  |  | 1 |
| properties | wet heat fatigue-(II) |  | times | $5.9 \times 10^4$ | $9.5 \times 10^4$ | $3.8 \times 10^4$ | $4.5 \times 10^4$ |
|  | retention of wet heat strength |  | % | 94 | 94 | 90 | 89 |
|  | rigidity |  | kgf/cm$^2$ | 44,500 | 70,500 | 40,000 | 44,000 |
|  | flowability |  | cm | 37 | 29 | 40 | 39 |
|  | notched impact |  | kgfcm/cm | 19 | 17 | 36 | 55 |

|  |  |  |  | Ex.30 | Ex.31 | Ex.32 | Ex.33 |
|---|---|---|---|---|---|---|---|
| composition | (a) | EX-PC | % by weight | 60 | 60 | 75 | 60 |
|  | (b) | ABS | % by weight | 40 | 40 |  |  |
|  |  | AS | % by weight |  |  | 25 | 30 |
|  |  | MBS | % by weight |  |  |  | 10 |
|  | total |  | parts by weight | 100 | 100 | 100 | 100 |
|  | (e) | G | parts by weight |  |  | 15 | 15 |
|  |  | W | parts by weight |  |  |  |  |
|  |  | T | parts by weight | 15 | 15 |  |  |
|  | (f) | WAX | parts by weight |  | 1 |  |  |
| properties | wet heat fatigue-(II) |  | times | $2.6 \times 10^4$ | $2.6 \times 10^4$ | $6.5 \times 10^4$ | $5.7 \times 10^4$ |
|  | retention of wet heat strength |  | % | 88 | 90 | 90 | 90 |
|  | rigidity |  | kgf/cm$^2$ | 37,300 | 40,700 | 45,400 | 44,800 |
|  | flowability |  | cm | 42 | 43 | 29 | 33 |
|  | notched impact |  | kgfcm/cm | 34 | 49 | 15 | 18 |

|  |  |  |  | C.Ex.14 | C.Ex.15 | C.Ex.16 | C.Ex.17 |
|---|---|---|---|---|---|---|---|
| composition | (a) | CEX-PC | % by weight | 60 | 60 | 60 | 60 |
|  | (b) | ABS | % by weight | 40 | 40 | 40 | 40 |
|  |  | AS | % by weight |  |  |  |  |
|  |  | MBS | % by weight |  |  |  |  |
|  | total |  | parts by weight | 100 | 100 | 100 | 100 |
|  | (e) | G | parts by weight | 15 | 30 |  |  |
|  |  | W | parts by weight |  |  | 15 | 15 |
|  |  | T | parts by weight |  |  |  |  |
|  | (f) | WAX | parts by weight |  |  |  | 1 |
| properties | wet heat fatigue-(II) |  | times | $6.3 \times 10^3$ | $9.4 \times 10^3$ | $3.8 \times 10^3$ | $4.0 \times 10^3$ |
|  | retention of wet heat strength |  | % | 22 | 26 | 17 | 20 |
|  | rigidity |  | kgf/cm$^2$ | 44,500 | 69,900 | 39,600 | 43,000 |
|  | flowability |  | cm | 36 | 32 | 38 | 39 |
|  | notched impact |  | kgfcm/cm | 10 | 7 | 20 | 24 |

|  |  |  |  | C.Ex.18 | C.Ex.19 | C.Ex.20 | C.Ex.21 |
|---|---|---|---|---|---|---|---|
| composition | (a) | CEX-PC | % by weight | 60 | 60 | 75 | 60 |
|  | (b) | ABS | % by weight | 40 | 40 |  |  |
|  |  | AS | % by weight |  |  | 25 | 30 |
|  |  | MBS | % by weight |  |  |  | 10 |
|  | total |  | parts by weight | 100 | 100 | 100 | 100 |

TABLE 7-continued

|   |   |   |   |   |   | 15 | 15 |
|---|---|---|---|---|---|---|---|
| | (e) | G | parts by weight | | | | |
| | | W | parts by weight | | | | |
| | | T | parts by weight | 15 | 15 | | |
| | (f) | WAX | parts by weight | | 1 | | |
| properties | wet heat fatigue-(II) | | times | $2.8 \times 10^3$ | $2.7 \times 10^3$ | $6.0 \times 10^3$ | $5.7 \times 10^3$ |
| | retention of wet heat strength | | % | 15 | 19 | 21 | 21 |
| | rigidity | | kgf/cm$^2$ | 37,000 | 38,700 | 44,800 | 44,700 |
| | flowability | | cm | 41 | 42 | 27 | 36 |
| | notched impact | | kgfcm/cm | 20 | 26 | 9 | 9 |

Ex.: Example
C.Ex.: Comparative Example

Examples 34–49 and Comparative Examples 22–28

One of the aromatic polycarbonate resins obtained above, other component(s) shown in Table 8 and 0.1 part by weight of a phosphorus-based stabilizer {cyclic neopentanetetrayl bis(octadecylphosphite), PEP-8 produced by Asahi Denka Kogyo K.K.} were uniformly mixed using a tumbler. The mixture was pelletized through a vented (30 mm in diameter) twin-screw extruder (KTX-30 produced by Kobe Steel, Ltd.) at a cylinder temperature of 260° C. with degassing at a vacuum of 10 mmHg. The pellets were dried at 120° C. for 5 hours and passed through an injection molding machine (SG150U produced by Sumitomo Heavy Industries, Ltd.) under the conditions of cylinder temperature=260° C. and mold temperature=70° C. to produce a molded sheet for measurement.

As is apparent from Table 8, the thermoplastic resin compositions of Examples, which were composed of an aromatic polyester resin(s) and an aromatic polycarbonate resin whose relative fluorescence intensity was in the range of the present invention are superior in wet heat fatigue in particular and also superior in chemical resistance and impact strength, as compared with the resin compositions of Comparative Examples using an aromatic polycarbonate resin whose relative fluorescence intensity was outside the range of the present invention.

TABLE 8

| | | | | Ex. 34 | Ex. 35 | Ex. 36 | Ex. 37 | Ex. 38 | Ex. 39 | Ex. 40 | Ex. 41 |
|---|---|---|---|---|---|---|---|---|---|---|---|
| composition | (a) | EX-PC | % by weight | 15 | 40 | 70 | 80 | 70 | 70 | 70 | 70 |
| | (b) | PBT | % by weight | | | | | | 5 | 5 | 5 |
| | | PET | % by weight | 85 | 60 | 30 | 20 | 30 | 25 | 25 | 25 |
| | | total | parts by weight | 100 | 100 | 100 | 100 | 100 | 100 | 100 | 100 |
| | (d) | E-1 | parts by weight | | | | | | 5 | | 5 |
| | | E-2 | parts by weight | | | | | | | | 5 |
| properties | wet heat fatigue-(II) | | times | $3.6 \times 10^3$ | $4.2 \times 10^3$ | $4.2 \times 10^3$ | $4.9 \times 10^3$ | $3.9 \times 10^3$ | $4.8 \times 10^3$ | $4.8 \times 10^3$ | $4.8 \times 10^3$ |
| | chemical resistance | | % | 93 | 90 | 82 | 79 | 81 | 86 | 84 | 84 |
| | notched impact | | kgfcm/cm | 21 | 22 | 24 | 29 | 60 | 27 | 65 | 64 |
| | heat resistance | | ° C. | 81 | 96 | 126 | 128 | 123 | 124 | 122 | 122 |

| | | | | Ex. 42 | Ex. 43 | Ex. 44 | Ex. 45 | Ex. 46 | Ex. 47 | Ex. 48 | Ex. 49 |
|---|---|---|---|---|---|---|---|---|---|---|---|
| composition | (a) | EX-PC | % by weight | 15 | 40 | 70 | 80 | 70 | 70 | 70 | 70 |
| | (b) | PBT | % by weight | 85 | 60 | 30 | 20 | 30 | 25 | 25 | 25 |
| | | PET | % by weight | | | | | | 5 | 5 | 5 |
| | | total | parts by weight | 100 | 100 | 100 | 100 | 100 | 100 | 100 | 100 |
| | (d) | E-1 | parts by weight | | | | | | 5 | | 5 |
| | | E-2 | parts by weight | | | | | | | | 5 |
| properties | wet heat fatigue-(II) | | times | $2.9 \times 10^3$ | $3.5 \times 10^3$ | $4.5 \times 10^3$ | $4.3 \times 10^3$ | $4.2 \times 10^3$ | $4.1 \times 10^3$ | $4.3 \times 10^3$ | $4.2 \times 10^3$ |
| | chemical resistance | | % | 93 | 91 | 87 | 83 | 86 | 88 | 86 | 87 |
| | notched impact | | kgfcm/cm | 19 | 21 | 23 | 26 | 64 | 29 | 62 | 63 |
| | heat resistance | | ° C. | 64 | 86 | 109 | 112 | 107 | 113 | 111 | 112 |

TABLE 8-continued

|  |  |  |  | C. Ex. 22 | C. Ex. 23 | C. Ex. 24 | C. Ex. 25 | C. Ex. 26 | C. Ex. 27 | C. Ex. 28 | C. Ex. 29 |
|---|---|---|---|---|---|---|---|---|---|---|---|
| composition | (a) | EX-PC | % by weight | 100 |  |  |  |  |  |  |  |
|  |  | CEX-PC | % by weight |  |  |  | 70 | 70 | 70 | 70 | 70 |
|  | (b) | PBT | % by weight |  | 100 |  |  |  | 5 | 30 | 30 |
|  |  | PET | % by weight |  |  | 100 | 30 | 30 | 25 |  |  |
|  |  | total | parts by weight | 100 | 100 | 100 | 100 | 100 | 100 | 100 | 100 |
|  | (d) | E-1 | parts by weight |  |  |  |  | 5 | 5 |  |  |
|  |  | E-2 | parts by weight |  |  |  |  |  |  |  | 5 |
| properties |  | wet heat fatigue-(II) | times | $5.4 \times 10^3$ | $1.9 \times 10^3$ | $2.0 \times 10^3$ | $8.5 \times 10^2$ | $8.6 \times 10^2$ | $9.0 \times 10^2$ | $8.5 \times 10^2$ | $8.2 \times 10^2$ |
|  |  | chemical resistance | % | 36 | 98 | 97 | 70 | 70 | 71 | 74 | 73 |
|  |  | notched impact | kgfcm/cm | 89 | 8 | 9 | 15 | 46 | 41 | 13 | 40 |
|  |  | heat resistance | ° C. | 136 | 61 | 78 | 123 | 120 | 118 | 108 | 105 |

Ex.: Example
C. Ex.: Comparative Example

Examples 50–61 and Comparative Examples 30–37

One of the aromatic polycarbonate resins obtained above, other components shown in Table 9 and 0.1 part by weight of a phosphorus-based stabilizer {cyclic neopentanetetrayl bis(octadecylphosphite), PEP-8 produced by Asahi Denka Kogyo K.K.} were uniformly mixed using a tumbler. The subsequent operation was conducted in the same manner as in Example 34 to produce a molded sheet for measurement.

As is apparent from Table 9, by adding an inorganic filler such as glass fiber, wollastonite, talc or the like to a thermoplastic resin composition of the present invention, further improvements in rigidity and wet heat fatigue are obtained while chemical resistance and impact strength are retained. Even when an inorganic filler is added to thermoplastic resin compositions composed of an aromatic polyester resin and an aromatic polycarbonate resin of Comparative Examples of Table 9, whose relative fluorescence intensity was outside of the range of present invention, improvement in wet heat fatigue is small and, moreover, impact strength and chemical resistance are also low. Thus, it is apparent that the present invention can give large effect in improvement.

TABLE 9

|  |  |  |  | Ex. 50 | Ex. 51 | Ex. 52 | Ex. 53 | Ex. 54 | Ex. 55 |
|---|---|---|---|---|---|---|---|---|---|
| composition | (a) | EX-PC | % by weight | 25 | 70 | 70 | 70 | 70 | 70 |
|  | (c) | PBT | % by weight |  |  |  |  |  | 5 |
|  |  | PET | % by weight | 75 | 30 | 30 | 30 | 30 | 25 |
|  |  | total | parts by weight | 100 | 100 | 100 | 100 | 100 | 100 |
|  | (d) | E-1 | parts by weight |  | 5 | 5 | 5 | 5 |  |
|  |  | E-2 | parts by weight |  |  |  |  |  | 5 |
|  | (e) | G | parts by weight | 50 | 20 | 10 |  |  |  |
|  |  | W | parts by weight |  |  |  | 10 | 10 |  |
|  |  | T | parts by weight |  |  |  |  |  | 10 |
|  | (f) | WAX | parts by weight |  |  |  |  | 1 | 1 |
| properties |  | wet heat fatigue-(II) | times | $6.5 \times 10^4$ | $4.2 \times 10^4$ | $2.9 \times 10^4$ | $2.9 \times 10^4$ | $3.1 \times 10^4$ | $2.7 \times 10^4$ |
|  |  | rigidity | kgf/cm$^2$ | 86,000 | 58,900 | 36,900 | 32,700 | 36,300 | 34,700 |
|  |  | chemical resistance | % | 91 | 89 | 85 | 83 | 85 | 83 |
|  |  | notched impact | kgcm/cm | 21 | 22 | 25 | 32 | 55 | 53 |
|  |  | heat resistance | ° C. | 183 | 130 | 129 | 128 | 128 | 127 |

|  |  |  |  | Ex. 56 | Ex. 57 | Ex. 58 | Ex. 59 | Ex. 60 | Ex. 61 |
|---|---|---|---|---|---|---|---|---|---|
| composition | (a) | EX-PC | % by weight | 25 | 70 | 70 | 70 | 70 | 70 |
|  | (c) | PBT | % by weight | 75 | 30 | 30 | 30 | 30 | 25 |
|  |  | PET | % by weight |  |  |  |  |  | 5 |
|  |  | total | parts by weight | 100 | 100 | 100 | 100 | 100 | 100 |
|  | (d) | E-1 | parts by weight |  | 5 | 5 | 5 | 5 |  |
|  |  | E-2 | parts by weight |  |  |  |  |  | 5 |

TABLE 9-continued

|  |  |  |  |  |  |  |  |  |  |
|---|---|---|---|---|---|---|---|---|---|
|  | (e) | G | parts by weight | 50 | 20 | 10 |  |  |  |
|  |  | W | parts by weight |  |  |  | 10 | 10 |  |
|  |  | T | parts by weight |  |  |  |  |  | 10 |
|  | (f) | WAX | parts by weight |  |  |  |  | 1 | 1 |
| properties | wet heat fatigue-(II) | | times | $5.0 \times 10^4$ | $3.4 \times 10^4$ | $2.5 \times 10^4$ | $2.3 \times 10^4$ | $2.7 \times 10^4$ | $2.0 \times 10^4$ |
|  | rigidity | | kgf/cm$^2$ | 86,700 | 59,600 | 36,000 | 32,700 | 37,400 | 34,800 |
|  | chemical resistance | | % | 92 | 89 | 85 | 85 | 86 | 84 |
|  | notched impact | | kgfcm/cm | 19 | 20 | 21 | 28 | 50 | 51 |
|  | heat resistance | | °C. | 183 | 124 | 122 | 118 | 119 | 117 |

|  |  |  |  | C. Ex. 30 | C. Ex. 31 | C. Ex. 32 | C. Ex. 33 | C. Ex. 34 | C. Ex. 35 | C. Ex. 36 | C. Ex. 37 |
|---|---|---|---|---|---|---|---|---|---|---|---|
| composition | (a) | CEX-PC | % by weight | 70 | 70 | 70 | 70 | 70 | 70 | 70 | 70 |
|  | (c) | PBT | % by weight |  |  |  | 5 | 30 | 30 | 30 | 25 |
|  |  | PET | % by weight | 30 | 30 | 30 | 25 |  |  |  | 5 |
|  |  | total | parts by weight | 100 | 100 | 100 | 100 | 100 | 100 | 100 | 100 |
|  | (d) | E-1 | parts by weight | 5 | 5 | 5 |  | 5 | 5 | 5 |  |
|  |  | E-2 | parts by weight |  |  |  | 5 |  |  |  | 5 |
|  | (e) | G | parts by weight | 10 |  |  |  | 10 |  |  |  |
|  |  | W | parts by weight |  | 10 | 10 |  |  | 10 | 10 |  |
|  |  | T | parts by weight |  |  |  | 10 |  |  |  | 10 |
|  | (f) | WAX | parts by weight |  | 1 | 1 |  |  |  | 1 | 1 |
| properties | wet heat fatigue-(II) | | times | $1.7 \times 10^3$ | $1.4 \times 10^3$ | $1.9 \times 10^3$ | $1.1 \times 10^3$ | $1.3 \times 10^3$ | $1.0 \times 10^3$ | $1.6 \times 10^3$ | $1.2 \times 10^3$ |
|  | rigidity | | kgf/cm$^2$ | 36,400 | 32,300 | 36,700 | 34,400 | 36,000 | 32,500 | 37,000 | 34,400 |
|  | chemical resistance | | % | 77 | 77 | 77 | 76 | 79 | 79 | 78 | 78 |
|  | notched impact | | kgfcm/cm | 12 | 13 | 18 | 17 | 12 | 12 | 17 | 16 |
|  | heat resistance | | °C. | 126 | 127 | 126 | 125 | 119 | 118 | 118 | 118 |

Ex.: Example
C. Ex.: Comparative Example

What is claimed is:

1. A resin composition composed substantially of
(1) 100 parts by weight of a resin component selected from:
  (a) an aromatic polycarbonate resin (A-1 component) obtained by melt polymerization and, when measured for fluorescent spectrum at an exciting wavelength of 320 nm, having a relative fluorescence intensity of $4 \times 10^{-3}$ or less at 465 nm relative to a standard substance,
  (b) a resin mixture composed of 10 to 90 parts by weight of said aromatic polycarbonate resin (A-1 component) and 90 to 10 parts by weight of a styrene-based resin (A-2 component), or
  (c) a resin mixture composed of 10 to 90 parts by weight of said aromatic polycarbonate resin (A-1 component) and 90 to 10 parts by weight of an aromatic polyester resin (A-3 component), and
(2) 5 to 200 parts by weight of at least one kind of reinforcing filler selected from the group consisting of a fibrous filler (B-1 component) and a platy filler (B-2 component).

2. A resin composition according to claim 1, wherein the aromatic polycarbonate resin (A-1 component) has a residual catalytic activity index of 2% or less.

3. A resin composition according to claim 1, wherein the aromatic polycarbonate resin (A-1 component) has a relative fluorescence intensity of $3 \times 10^{-3}$ or less.

4. A resin composition according to claim 1, wherein the styrene-based resin (A-2 component) contains at least 20% by weight of styrene monomer units of the total constituent units.

5. A resin composition according to claim 1, wherein the styrene-based resin (A-2 component) is at least one kind of resin selected from the group consisting of a polystyrene, a high-impact polystyrene (HIPS), an acrylonitrile-styrene copolymer (AS resin), a methyl methacrylate-butadiene-styrene copolymer (MBS resin) and an acrylonitrile-butadiene-styrene copolymer (ABS resin).

6. A resin composition according to claim 1, wherein the aromatic polyester resin (A-3 component) is at least one kind of resin selected from the group consisting of a polyethylene terephthalate, a polyethylene naphthalate, a polybutylene terephthalate and a polybutylene naphthalate.

7. A resin composition according to claim 1, wherein the resin component is the aromatic polycarbonate resin (A-1 component).

8. A resin composition according to claim 1, wherein the resin component is composed of 40 to 90 parts by weight of the aromatic polycarbonate resin (A-1 component) and 60 to 10 parts by weight of the styrene-based resin (A-2 component).

9. A resin composition according to claim 1, wherein the resin component is composed of 20 to 80 parts by weight of the aromatic polycarbonate resin (A-1 component) and 80 to 20 parts by weight of the aromatic polyester resin (A-3 component).

10. A resin composition according to claim 1, wherein the resin component further contains an elastomeric polymer (A-4 component) in an amount of 1 to 15% by weight based on the total resin component.

11. A resin composition according to claim 1, wherein the fibrous filler (B-1 component) is at least one kind of filler selected from the group consisting of a glass fiber, a carbon fiber and wollastonite.

12. A resin composition according to claim 1, wherein the platy filler (B-2 component) is at least one kind of filler selected from the group consisting of glass flakes, mica and talc.

13. A resin composition according to claim 1, which was composed substantially of 100 parts by weight of the resin component and 10 to 150 parts by weight of the reinforcing filler.

14. A resin composition composed substantially of (a) 10 to 90 parts by weight of an aromatic polycarbonate resin (A-1 component) obtained by melt polymerization and, when measured for fluorescent spectrum at an exciting wavelength of 320 nm, having a relative fluorescence intensity of $4 \times 10^{-3}$ or less at 465 nm relative to a standard substance, and (b) 90 to 10 parts by weight of a styrene-based resin (A-2 component) or an aromatic polyester resin (A-3 component).

15. A resin composition according to claim 14, wherein the aromatic polycarbonate resin (A-1 component) has a residual catalytic activity index of 2% or less.

16. A resin composition according to claim 14, wherein the aromatic polycarbonate resin (A-1 component) has a relative fluorescence intensity of $3 \times 10^{-3}$ or less.

17. A resin composition according to claim 14, wherein the styrene-based resin (A-2 component) contains at least 20% by weight of styrene monomer units of the total constituent units.

18. A resin composition according to claim 14, wherein the styrene-based resin (A-2 component) is at least one kind of resin selected from the group consisting of a polystyrene, a high-impact polystyrene (HIPS), an acrylonitrile-styrene copolymer (AS resin), a methyl methacrylate-butadiene-styrene copolymer (MBS resin) and an acrylonitrile-butadiene-styrene copolymer (ABS resin).

19. A resin composition according to claim 14, wherein the aromatic polyester resin (A-3 component) is at least one kind of resin selected form the group consisting of a polyethylene terephthalate, a polyethylene naphthalate, a polybutylene terephthalate and a polybutylene naphthalate.

20. A resin composition according to claim 14, wherein the resin component is composed of 40 to 90 parts by weight of the aromatic polycarbonate resin (A-1 component) and 60 to 10 parts by weight of the styrene-based resin (A-2 component).

21. A resin composition according to claim 14, wherein the resin component is composed of 20 to 80 parts by weight of the aromatic polycarbonate resin (A-1 component) and 80 to 20 parts by weight of the aromatic polyester resin (A-3 component).

22. A resin composition according to claim 14, wherein the resin component further contains an elastomeric polymer (A-4 component) in an amount of 1 to 15% by weight based on the total resin component.

23. A molded article formed from a resin composition set forth in claim 1.

24. A molded article formed from a resin composition set forth in claim 14.

* * * * *